US012288189B2

(12) United States Patent
Maes

(10) Patent No.: US 12,288,189 B2
(45) Date of Patent: Apr. 29, 2025

(54) ENTERPRISE AND INFORMATION TECHNOLOGY SERVICES MANAGEMENT ORCHESTRATING A PLURALITY OF ENTERPRISE APPLICATIONS

(71) Applicant: IFS World Operations AB, Linköping (SE)

(72) Inventor: Stéphane H. Maes, Fremont, CA (US)

(73) Assignee: IFS World Operations AB, Linköping (SE)

( * ) Notice: Subject to any disclaimer, the term of this patent is extended or adjusted under 35 U.S.C. 154(b) by 267 days.

(21) Appl. No.: 17/974,243

(22) Filed: Oct. 26, 2022

(65) Prior Publication Data
US 2023/0128700 A1 Apr. 27, 2023

Related U.S. Application Data

(60) Provisional application No. 63/272,309, filed on Oct. 27, 2021.

(51) Int. Cl.
*G06Q 30/00* (2023.01)
*G06Q 10/10* (2023.01)

(52) U.S. Cl.
CPC ................. *G06Q 10/103* (2013.01)

(58) Field of Classification Search
None
See application file for complete search history.

(56) References Cited

U.S. PATENT DOCUMENTS

| 2004/0006610 A1* | 1/2004 | Anagol-Subbarao ............... G06Q 10/06 707/E17.116 |
| 2009/0216885 A1* | 8/2009 | Brunswig ............ G06Q 10/00 709/227 |
| 2009/0319576 A1* | 12/2009 | Srour .................. H04L 41/0866 |
| 2014/0201331 A1* | 7/2014 | Kershaw ............... H04L 41/509 709/219 |
| 2015/0074279 A1* | 3/2015 | Maes ...................... H04L 67/51 709/226 |

(Continued)

OTHER PUBLICATIONS

Milestone checkpointing in multi-agent applications Author: Wang, Pingye. Publication info: Concordia University (Canada). ProQuest Dissertations & Theses, 2005. MR04456. (Year: 2005).*

(Continued)

*Primary Examiner* — Matthew T Sittner
(74) *Attorney, Agent, or Firm* — Rothwell, Figg, Ernst & Manbeck, P.C.

(57) ABSTRACT

A computer implemented method performed by a system for providing enterprise and information technology services management orchestrating a plurality of enterprise applications. The method includes receiving, in the system, a request for a service. The method includes determining, based on the received service request, one or more calls to implement a process for fulfilling the requested service. The method includes conveying, to the one or more of the plurality of enterprise applications, the one or more calls. The method includes receiving, from the one or more enterprise applications that received the one or more calls, a response for the fulfillment of the requested service. The method includes determining, based on the received response, a completion status of the service request.

22 Claims, 18 Drawing Sheets

(56) References Cited

U.S. PATENT DOCUMENTS

| | | | |
|---|---|---|---|
| 2016/0036686 A1* | 2/2016 | Vendrow | H04L 45/021 |
| | | | 370/254 |
| 2016/0127418 A1* | 5/2016 | Maes | H04L 63/20 |
| | | | 726/1 |
| 2019/0222988 A1* | 7/2019 | Maes | H04L 41/5054 |
| 2019/0268214 A1* | 8/2019 | Maes | G06F 18/24 |
| 2022/0198474 A1* | 6/2022 | DeLuca | G06Q 10/047 |

OTHER PUBLICATIONS

Augmenting agent negotiation protocols with a dynamic argumentation mechanism Author: Ulrich, Thomas W . . . Publication info: Colorado Technical University. ProQuest Dissertations & Theses, 2003. 3109037. (Year: 2003).*

Event Management of Large Distributed System and Network Management Environments Author: Parsons, Antony Gavin James. Publication info: University of Technology Sydney (Australia), ProQuest Dissertations & Theses, 2006. 31094938. (Year: 2006).*

* cited by examiner

ENTERPRISE AND INFORMATION TECHNOLOGY SERVICES MANAGEMENT ORCHESTRATING A PLURALITY OF ENTERPRISE APPLICATIONS

CROSS REFERENCE TO RELATED APPLICATION(S)

This application is claims priority to U.S. Provisional Application Ser. No. 63/272,309, filed Oct. 27, 2021, the disclosure of which is incorporated herein by reference in its entirety.

TECHNICAL FIELD

Disclosed are embodiments related generally to business process management and, more particularly, to enterprise and information technology services management orchestrating a plurality of enterprise applications.

BACKGROUND

Enterprise applications focus on specific department processes or vertical processes. Department processes include, for example, processes for one or a few departments and functions within an enterprise. Here, an enterprise may be an enterprise large or small, one or more manufacturers, one or more service providers, and/or other generic or industry vertical businesses. An enterprise may relate to, for example, sales, presales, field support, human resources (HR). procurement, partner management, business development (BD), marketing, and/or information technology (IT) (e.g., with IT service management (ITSM) and/or IT operations management (ITOM)), or R&D with DevOps tool chain. Vertical processes may be, for example, specific to telecommunications (e.g., with operation support/business support systems (OSS/BSS)), aerospace, a service industry, or transportation.

Enterprise applications hard code in their internal logic some of the processes that are essential to run within the department and the data that these processes rely on. Examples of such processes are described in IT Infrastructure Library (ITIL (Today ITILv4)) and IT4IT (for IT; IT4IT also includes a data model) or in enhanced Telecom Operations Map (eTOM) with the accompanying Shared Information Data (SID) data model (for telecommunications). Many other industries or departments never formalized their process as standards but have them contained in their preferred enterprise applications.

Enterprises and departments can then customize these processes to their need through the tools or configurations provided by the respective applications. If enterprises and departments stretch these capabilities, the result is often customized processes for an enterprise application that become very hard to maintain when the application is upgraded to a new version and/or difficult (even nightmarish) to migrate if the company decides to change its enterprise applications (e.g., if a company goes from Systems, Applications, and Products (SAP) to Oracle, or IFS). There are siloes, typically aligned with a related department, or a few departments or user types/specializations/functions, around each specific enterprise application. Some can also be industry vertical specific.

Enterprise application integration frameworks have flourished around different integration patterns, such as, for example, Enterprise Application Integration (EAI), Application Integration Architecture (AIA), Hubs, Point to Point, or Enterprise Service Bus (ESB), to allow an application to retrieve information from another application, or call or delegate a function to another application. Vendors have also provided connectors to facilitate such integrations. Such integration is often brittle (e.g., linked to very specific versions of the applications, requiring knowledge of the end point addresses, or having to discover knowledge of the end point address and application/vendor specific). Enterprise application integration frameworks and connectors work but must be developed by developers, engineers, and technical people, and the user experience when drilling down, debugging, status tracking, or updating is required is bound to be jumping left and right across totally different applications with different user interfaces (UIs), user experiences (UXs), and behaviors. Enterprise application integration frameworks and connectors are not at all empowering the business user or end user and does not bridge the siloes (e.g. a business user can't easily offer a service, let alone design it and its process, especially if it involves services or process from other departments).

Alternatively, workflow technologies (e.g., OO, Ansible) and orchestration technologies like Business Process Model and Notation (BPMN) and Business Process Execution Language (BPEL) allow orchestration of these applications. However, these tools require expert programmers, and otherwise jumping between quite different applications. Besides the curiosity of some BPEL implementations of eTOM (IBM), true implementation of such patterns have only been encountered successfully in AIA (Oracle) and conceptually in IT4IT (Open Group). Companies like Workato have offered some recipes that provide portions of workflows and connectors to design and execute some such orchestration across multiple enterprise applications. These approaches remain typically limited to the development of a new application or service that delegates these flows and does not bridge the siloes of the involved enterprise applications and of the organizations using them, nor make it something that business user can use in new offerings.

SUMMARY

In conventional business process management, many processes between the enterprise applications are not automated and are often not at all formalized. Embodiments disclosed herein focus on a different approach: the ability to use enterprise service management (ESM) as a self-service front-end and orchestrator to the different enterprise applications. ESM may be an application applying IT service management (ITSM)/ITIL v4.x (or earlier) to other areas of an enterprise or organization (e.g., with the purpose of improving performance, efficiency, and/or service delivery).

ESM/ITSM can implement ITIL as an omni-channel frontend system to where a user can, with a self-service request catalog item, seek support and knowledge. Workflow triggers by the requests, and agents then fulfill the request or help solve the problem using ITSM. SLAs are tracked for all activities, and reports are available. Requests can also be subject to approval (automated or manual). SLA violation can result into notifications or escalations. ESM is adapting it to any line of business/department.

ESM may include the use of ITSM principles and capabilities in business functions to improve their performance, service, and outcomes. ESM may include a self-service portal, with subsequent request fulfillment (and management), easy access to knowledge (e.g., self-service knowledge management), automation of ticketing (e.g., support tickets), and/or problem management. ESM may include change management, asset management, and/or discovery/inventory capabilities. ESM may apply a service-oriented business model to the way an organization works internally. ESM may be an operational architecture (e.g., a model) where each service provider within the organization—whether IT or HR, or Facilities, or any other department—is defined as a service domain that offers services to people within an organization or stakeholders (e.g., employees or customers/suppliers/partners).

In some aspects, the ability to use ESM as a front-end and orchestrator to the different enterprise applications may provide one or more of the following advantages: (i) self-service to end users (e.g., who want to use the system to execute tasks and/or requests pertinent to the enterprise) and business users (e.g., that want to design, automate, manage, and/or monitor these tasks and fulfillment of the requests), (ii) multi-channel (e.g., using different channels) or omni channel (e.g., using consistent interactions across channels) access to self service, (iii) rapid, as fast as possible, or expected, by the end user, fulfillment of the request and completion of the task and delivery of the result or outcome in a predictable manner (e.g., coupled with well tractable catalog of supported request), (iv) new user experience for all involved personas, (v) agents are able to help fulfill requests and/or handle and resolve support issues and can use ESM to interact in an omni-channel way with users, with ESM (e.g. issue description aka ticket) and with other agents (e.g. swarming/collaborate/war room to resolve a problem), (vi) digital transformation of the business with automation and management of the automation throughout all the process, among and across the different organizations, (vii) efficient support of all the parties through self-service knowledge management and support (e.g., ticketing and problem management) provided by the ITSM (ITIL processes) at the foundation of ESM. Low code or now code automation design available to business user who can design the workflow (and rely on existing connectors or solutions a la Workato or Boomi to "connect to the orchestrated enterprise applications).

In some respects, the ability to use ESM as a front-end and orchestrator to the different enterprise applications may digitally transform any business and/or may be easier than custom building new front-ends. In some aspects, when combined with predictive analytics, machine learning (ML) and/or artificial intelligence (AI) (and/or process/systems/application monitoring a la business process management (BPM) and ITOM), the use of ESM as a front-end and orchestrator to the different enterprise applications may additionally or alternatively provide: (i) smart interfaces (e.g., Voice, Natural language), (ii) smart behavior (e.g., (NLP based—Natural Language Processing) Search (both as natural or conversational search input or smart search), smart ticket routing, process selection, and/or process construction in flight), (iii) smart remediation (e.g., automated correction to problem encountered with a process or application), which may include automated remediation or smart notification to party or system who can remediate, possibly with analysis of the root cause of the problem or providing options for a remediation to execute, and/or (v) problem prediction and avoidance. Aspects of the present invention may include aspects of Artificial Intelligence for IT Operations (AIOps), Autonomous IT, and/or No/Low IT generalized to the whole enterprise processes (i.e., not just limited to IT).

The existing framework of coexistence of the different enterprise applications within an enterprise (e.g., across organizations or also involving industry vertical applications) is described above. Each application corresponds to (e.g., is used and understood by) a silo of a department or function or a subset of departments. They each may have different siloed UI, UX, and data. There are exceptions, like IFS cloud, where a database is shared across all the applications, or with enterprise applications built on a data lake/warehouse/mesh. Conventional attempts to integrate the applications require complex development by developers/engineers and hard code the flows in ways hard to change/customize or support the changes of upgrades to one or more of the applications. Business processes design, update or monitoring are currently usually out of reach of business users as are easily making services of the department available in omni-channel self-services.

In addition, end-to-end processes rarely exist, are unpredictable, prone to bugs and security issues, and hard to monitor and fix when problems are encountered. As a result, many existing processes remain manual with different people in different organizations triggering their part of an end-to-end process. As a result, the existing experience is inefficient and frustrating for end users trying to interact with a business in a self-service manner and expecting fast fulfillment of their request and/or efficient self-served support. None of the existing integration patterns addresses these shortcomings. That is, EAI, AIA, BPEL, stand alone workflows, Workato, etc. are not addressing any of that. Data integration with data warehouse, data lakes, or data mesh can be used for separate analytics (real time or after the facts) across the company but similarly do not address these issues and/or provide any of the advantages, which may be provided by some aspects of the present invention. Even enterprise portal solutions, that have existed for a while now, typically only offer widgets, or catalog entries that are then re-directed to the target enterprise application: i.e. just a switch at the portal or the catalog entry that routes the user to a given application.

Existing ESM deployments, which are available from vendors like BMC, Micro Focus, Service Now, Ivanti, and IFS, suffer from short comings and limitations. First, just like ITSM is limited to IT department serving its end-user or customers (mostly the employees of the enterprise sometimes the actual customers, partners, or suppliers of the company if they depend on IT services offered by the company), existing ESM deployments by HR, BD/partner/alliance department, procurement, customer engagement, etc. are very much again limited to simple use cases within each silo (of the organization implementing it), even if ESM could be deployed enterprise wide. Second, within the silo, a self-service application for the specific vertical or organization domain is built using ESM and its processes. The self-service application provides a self-service multi/omni channel portal to access to knowledge (search, ask question), submit request, submit issues, and possibly chat with agents from the department (usually to handle issues, may be questions). Yet, unless lots of efforts are made or if it is done by say experts in all the details of the typical enterprise Lines of Business (LOBs), self-service application does not implement most of these "internal" business processes. That is, they are done by the original enterprise app, separately. Moreover, the agent of the organization that handles a request or support will probably revert to that enterprise apps to fulfill the needs, when done manually, or ask the original user to use that enterprise application instead of ESM. Some may be automated but only if they correspond to a clear end user or business user/agent interaction. In other words, the use case for each LOB is pretty simple, with no or limited involvement of the enterprise applications, or used to delegate interaction with the enterprise app by an agent (on behalf) or support the user to find out how to do it with the enterprise applications. It is improving the interactions, but so much more can still be done.

Embodiments disclosed herein may provide one or more of the following features, which are not provided by existing ESM deployments, and their associated ITIL practices or processes: (i) requests may a priori trigger and orchestrate one or multiple enterprise applications, (ii) results and status may be presented back to requester and may be monitored by others and troubleshooted, (iii) agents, when involved may be able to trigger through ESM next steps in a process (e.g., post approval or clarification of request) or launch new processes that will also interact with one or more enterprise applications (e.g., ordering, inventory check, credit check, billing, or charging), (iv) these business processes may be built with low/no code by business users using connectors or workflow provided for the enterprise application to orchestrate, (v) end user, business user and agents (i.e., all the personas interaction with ESM) have a omni-channel modern user experience and UIs enabling fast and efficient, automated, and/or smart with AI end-to-end experiences, (vi) processes may be predictable even outside an enterprise application or organization, manageable, safe, and/or recoverable/resilient, and/or (vii) the whole enterprise may be automated, autonomous, and de facto digitally transformed.

In some aspects, enterprise applications may be re-architected (or built from scratch) this way. Accordingly, the approach may be suitable to orchestrate, for example, customer relationship management (CRM), enterprise resource planning (ERP), inventory, billing, or between ITSM, FSM (Field Service Management) and CRM, and/or to actually re-build a new CRM application where process, data and UI is entirely relying on ESM. Existing ESM deployment do not provide these features.

Embodiments disclosed herein may add smartness and AI to ESM, which may result in the ability to: (i) autonomously manage, including possibly self healing, all aspects or end to end aspects of the business processes and systems supporting or involved in it and/or (ii) autonomously select what process to use (e.g., for a request as well as for an issue or when an application needs to interact with another application), and/or may result in a fully autonomous enterprise (for its processes).

Smartness has been introduced to ITSM and ESM (Virtual agents, NLP, Voice, smart routing, Smart Knowledge Management (KM) and searches etc). AIOps has been partially applied to business process, but existing solutions do none of remediating by selecting new processes, autonomous remediation, and problem prediction with the processes and their resources). Existing solutions also do not perform autonomous selection.

Vendors like FreshWorks are CRM vendors with a portfolio of enterprise applications (e.g., CRM, HR, Marketing, . . . ), and an ITSM as a separate module, but do not provide an ESM built on ITSM as common frontend and orchestrator of the enterprise applications. For instance, existing enterprise application-based solutions do not provide a familiar and compelling omnichannel self-service a la ESM. Also, existing solutions are complicated to use and have the disadvantage of requiring end user training before being able to use say CRM to interact in self-service.

Accordingly, in one aspect there is provided a computer implemented method performed by a system for providing enterprise and information technology services management orchestrating a plurality of enterprise applications. The method includes receiving, in the system, a request for a service. The method includes determining, based on the received service request (i.e. how it's fulfillment has been designed), typically selected from a catalog of possible/supported requests, one or more calls to implement a process for fulfilling the requested service. The method includes conveying, to the one or more of the plurality of enterprise applications, the one or more calls. The method includes receiving, from the one or more enterprise applications that received the one or more calls, a response for the fulfillment of the requested service. The method includes determining, based on the received response, a completion status of the service request.

In some embodiments, the process implemented by the one or more calls includes a process internal to the system, a process externally defined via a workflow, and/or a process of one or more of the plurality of enterprise applications. In some embodiments, the method includes performing a workflow, wherein performance of the workflow is triggered by the received request and conveying, to the one or more of the plurality of enterprise applications, the one or more calls is triggered by the workflow.

In some embodiments, the method includes, if the determination of the completion status of the service request is that the request status is incomplete: (i) determining, based on the received response, one or more additional calls to implement an additional process for fulfilling the requested service; (ii) conveying, to the one or more of the plurality of enterprise applications, the additional one or more calls; (iii) receiving, from the one or more enterprise applications that received the one or more additional calls, an additional response for fulfillment of the requested service; (iv) determining, based on the received additional response, an updated completion status of the service request; and repeating steps (i) to (iv) until the updated completion status of the service request is that the request status is complete.

In some embodiments, the method includes performing a workflow, wherein performing the workflow is triggered by the received response and conveying, to the one or more of the plurality of enterprise applications, the one or more additional calls is triggered by the workflow.

In some embodiments, the requested service involves one or more of creation of, knowledge of, management of, optimization of, clarification of, request for, support for, or access to information, a service offered in a catalog, and/or a business process.

In some embodiments, the plurality of enterprise applications are software applications that relate to business processes of an enterprise, wherein each business process is specific to a particular domain of an enterprise and wherein the particular domain is any of: Information Technology (IT), DevOps, Security, Procurement, Human Resources (HR)/talent and recruitment, Facility management, Enterprise Resource Planning (ERP), Customer Relations Management (CRM), procurement, travel, partner management, customer management, Field service management, enterprise asset management, and/or financials, and other OSS or BSS systems.

In some embodiments, the received request for service is made by a user through any of: a self-service omni-channel portal, a collaboration software system, a mobile application, an Internet application, a client application, a multimodal channel, an omni-channel, a voice message, a video message, a text based message, a selection from a catalog of user requests, using a graphical user interface (GUI), and/or using a chat bot, a virtual agent, a conversational system, bot or a human agent, including possibly through a call center/phone, making a request on behalf of the user.

In some embodiments, the user that made the received request for service is empowered to continue to use a selected business process specific to a particular domain of the enterprise, if they prefer so, while other users of the system are not required to continue to use the selected business process specific to the particular domain for the requested service. In some embodiments, the other users of the system can use any of the enterprise applications for requesting service through the self-service omni-channel portal.

In some embodiments, users can at any time decide (if they prefer in general or for a specific request, or be prompted if a service is implemented that way) to use and/or go use a specific enterprise application. Some classes of users can use a preferred enterprise application (e.g. devops tool chain and work management like Jira), that has its process updating and updated by ESM, so that other users (e.g. business users, product management etc) can use ESM to manage R&D.

In some embodiments, the plurality of enterprise applications includes a customer relationship management (CRM) application, a human resources (HR) application, an enterprise resource planning (ERP) application, a project management application, a data services application, a marketing and/or sales application, an IT application, a support application, a finance and/or accounting application, a pre-sale application, a purchasing and/or procurement application, or a partner management, a customer management application, Field service management, enterprise asset management, OSS, BSS, travel, procurement, devOps/development tool chain.

In some embodiments, the method includes performing a workflow, wherein the workflow is designed low code/no code using a graphical user interface (GUI) or by combining one or more existing workflows saved in a catalog, rather than by coding.

In some embodiments, the received request for a service is self-service from a user and the fulfillment of the requested service is to the user.

In some embodiments, the request for service received in the system is through an application programming interface (API) call from any of: an enterprise application, a business process, and/or a service within the system, and/or from one or more external systems or clients.

In some embodiments, one or more of the steps includes using artificial intelligence (AI), wherein the AI includes a machine learning (ML) model, and wherein using AI enables any of: autonomously completing a business process, including while interacting with a user; interpreting a request or response; determining which of the plurality of enterprise applications to call; determining the cause of an error through root cause analysis; making recommendations to remediate an error; implementing conversational and natural language interfaces; implementing advanced searches to support a request or response; analyzing reports and autonomous fulfillment of a request; monitoring request status; predicting and detecting problems in the system; and/or implementing solutions to detected problems.

In some embodiments, the received request for an service is from a user, and the method includes prompting the user, from the system, via a prompt, in the event the user is available on a web application or in a chat, or by sending a notification, with a follow-up request for interaction by the user, wherein the request for interaction was conveyed by one or more of the plurality of enterprise applications or by the system in connection with fulfillment of the requested service; receiving, in the system, a user answer; determining, based on the user answer, one or more next steps in a workflow, including one or more additional calls to one or more of the plurality of enterprise applications for fulfillment of the requested service; and conveying, to the one or more of the plurality of enterprise applications, the one or more additional calls for fulfillment of the requested service based on the user answer.

In some embodiments, the ESM system or and enterprise app (or a step of the workflow) asks or notify the user for more information. The notification may prompt the user to, for example, fill additional information (e.g. fill a follow-up form) in ESM or sometimes to connect to an enterprise to do so (or to do both). The user then interacts with ESM (omni channel e.g. filling the form) or via the enterprise app if needed/option selected to provide the input to the next step.

In some embodiments, the method includes receiving, in the system, a request for external system interaction conveyed by an enterprise application; conveying through an application programming interface (API) call to an external system; receiving, in the system, a response conveyed by the external system; and conveying a response to the request for external system interaction to the enterprise application (or to the ESM workflow).

In another aspect, there is provided a computer program product comprising a non-transitory computer readable medium storing a computer program comprising instructions which, when executed on at least one processor of a system for providing enterprise and information technology services management orchestrating a plurality of enterprise applications, cause the system to receive, in the system, a request for a service; determine, based on the received service request, one or more calls to implement a process for fulfilling the requested service; convey, to the one or more of the plurality of enterprise applications, the one or more calls; receive, from the one or more enterprise applications that received the one or more calls, a response for the fulfillment of the requested service; and determine, based on the received response, a completion status of the service request.

In another aspect, there is provided a system for providing enterprise and information technology services management orchestrating a plurality of enterprise applications. The system includes processing circuitry; and a memory, the memory containing instructions executable by the processing circuitry, whereby the system is configured to receive, in the system, a request for a service; determine, based on the received service request, one or more calls to implement a process for fulfilling the requested service; convey, to the one or more of the plurality of enterprise applications, the one or more calls; receive, from the one or more enterprise applications that received the one or more calls, a response for the fulfillment of the requested service; and determine, based on the received response, a completion status of the service request.

In another aspect, there is provided a computer implemented method performed by an enterprise application in communication with a system for providing enterprise and information technology services management orchestrating a plurality of enterprise applications. The method includes sending, by the enterprise application, to the system a request for service. The method includes receiving, from the system, one or more calls to implement a process for fulfilling the requested service. The method includes sending, by the enterprise application, to the system a response for the fulfillment of the requested service.

In another aspect, there is provided a computer program product comprising a non-transitory computer readable medium storing a computer program comprising instructions which, when executed on at least one processor of an enterprise application, cause the enterprise application to send, by the enterprise application, to the system a request for service; receive, from the system, one or more calls to implement a process for fulfilling the requested service; and send, by the enterprise application, to the system a response for the fulfillment of the requested service.

In another aspect, there is provided a system for providing enterprise and information technology services management orchestrating a plurality of enterprise applications in communication with an enterprise application, comprising processing circuitry; and a memory, the memory containing instructions executable by the processing circuitry, whereby the system is configured to send, by the enterprise application, to the system a request for service; receive, from the system, one or more calls to implement a process for fulfilling the requested service; and send, by the enterprise application, to the system a response for the fulfillment of the requested service.

In another aspect, there is provided a method performed by an enterprise service management (ESM) system. The method may include receiving a request. The method may include conveying a first call to a first enterprise application. The method may include receiving a first response conveyed by the first enterprise application. The method may include conveying a second call to a second enterprise application. The second call may be triggered by the received first response. The method may include receiving a second response conveyed by the second enterprise application.

In some aspects, the received request may be a user request. In some aspects, the user request may be a selection from a catalog of user requests. In some aspects, the user request may be received via voice, video, messaging (e.g., SMS, MMS, Messenger, WhatsApp), email, a chat bot, a virtual agent, a conversational system, a collaboration system (e.g., Teams or Slack), a mobile channel, the Internet, a browser, a client application, a multi-modal channel, or an omni-channel.

In some aspects, the request may be conveyed by an enterprise application of an enterprise including the first and second enterprise applications or by a system outside of the enterprise. In some aspects, the method may further include performing a workflow, and the workflow may be triggered by the received request and the workflow triggers the call to the first enterprise application. In some aspects, the method may further include conveying one or more additional calls and receiving one or more responses thereto, and the one or more additional call may be conveyed to one or more enterprise applications of an enterprise including the first and second enterprise applications and/or to one or more systems outside of the enterprise.

In some aspects, the method may further include confirming completion of workflow in response to the received request.

In some aspects, the method may further include receiving a third call conveyed by the first enterprise application, and the first enterprise application may have conveyed the third call in response to the first call. In some aspects, the method may further include performing a request workflow triggered by the third call, and performing the request workflow may include conveying one or more additional calls. In some aspects, the method may further include receiving one or more responses to the one or more additional calls. In some aspects, the method may further include conveying to the first enterprise application a response to the third call. In some aspects, the received call may be through an application programming interface (API) call. In some aspects, the one or more additional call are conveyed to one or more enterprise applications of an enterprise including the first and second enterprise applications and/or to one or more systems outside of the enterprise.

In some aspects, the method may further include receiving a request for interaction by a user of the ESM system, and the request for interaction may have been conveyed by the first enterprise application in response to the first call. In some embodiments, the request for interaction may also be from the ESM system or its currently executing workflow. In some aspects, the method may further include providing a user interaction request. In some aspects, the method may further include receiving a user answer. In some aspects, the method may further include conveying a response to the request for interaction to the first enterprise application. In some aspects, the method may further include the user interaction request includes a form to be filled by a user. In some aspects, the form may be a pre-existing form. In some aspects, the method may further include generating dynamically the form.

In some aspects, the method may further include receiving a request for external system interaction conveyed by the first enterprise application, and the first enterprise application may have conveyed the request for external system interaction in response to the first call. In some aspects, the method may further include conveying through an application programming interface (API) call to an external system. In some aspects, the method may further include receiving a response conveyed by the external system. In some aspects, the method may further include conveying a response to the request for external system interaction to the first enterprise application.

In another aspect, there is provided an enterprise service management (ESM) system. The ESM system may be configured to receive a request. The ESM system may be configured to convey a first call to a first enterprise application. The ESM system may be configured to receive a first response conveyed by the first enterprise application. The ESM system may be configured to convey a second call to a second enterprise application. The second call may be triggered by the received first response. The ESM system may be configured to receive a second response conveyed by the second enterprise application.

In another aspect, there is provided a method performed by an enterprise service management (ESM) system. The method may include receiving a first request conveyed by a first enterprise application. A user of the first enterprise application may cause the first enterprise application to convey the request. The method may include conveying a second request. The second request may be triggered by the first request. The method may include receiving a response to the second request. The method may include conveying to the first enterprise application a response to the first request.

In some aspects, the first request may include a request for interaction by a user of the ESM system, the second request may include a user interaction request, the received response to the second request may include a user answer, and/or the response to the first request may include a response to the request for interaction. In some aspects, the user interaction request may include a form to be filled by a user. In some aspects, the form may be a pre-existing form. In some aspects, the method may further include generating dynamically the form.

In some aspects, the first request may include a request for external system interaction, conveying the second request may include conveying through an application programming interface (API) call to an external system, and the received response to the second request may have been conveyed by the external system.

In some aspects, the first request may include a first call, the method may further include performing a request workflow triggered by the first call, performing the request workflow may include conveying the second request, and the first request may include a second call. In some aspects, the received first call may be through an application programming interface (API) call. In some aspects, the second call may be conveyed to a second enterprise application of an enterprise including the first and second enterprise applications or to a system outside of the enterprise.

In another aspect, there is provided an enterprise service management (ESM) system. The ESM system may be configured to receive a first request conveyed by a first enterprise application. The user of the first enterprise application may cause the first enterprise application to convey the request. The ESM system may be configured to convey a second request, and the second request may be triggered by the first request. The ESM system may be configured to receive a response to the second request. The ESM system may be configured to convey to the first enterprise application a response to the first request.

In another aspect, there is provided a carrier containing one or more of the computer programs disclosed herein, and the carrier may be one of an electronic signal, an optical signal, a radio signal, and a computer readable storage medium.

Yet another aspect of the embodiments disclosed herein may provide any combination of the aspects set forth above. In yet another aspect, when provisioning a new user, organization, offering or workflow, the relevant may be loaded or cached from the enterprise applications for efficiency—e.g. cost or rates of a service based on organizations or location of user, SLA based on a contract with a user or organization, and/or managed facilities associated to organization of user. This allows appropriate fast pre-population of catalog for that user/organization and all related management.

In other aspects, other schemes can be used like, for example, sharing or access to a database, caching from history of user and organization, and ability to be updated of changes (e.g. price changes or new facilities added).

Further variations encompassed within the systems, methods, and computer program products disclosed herein are described in the detailed description.

BRIEF DESCRIPTION OF THE DRAWINGS

The accompanying drawings, which are incorporated herein and form part of the specification, illustrate various, non-limiting embodiments.

DETAILED DESCRIPTION OF PREFERRED EMBODIMENTS

Figure 1:
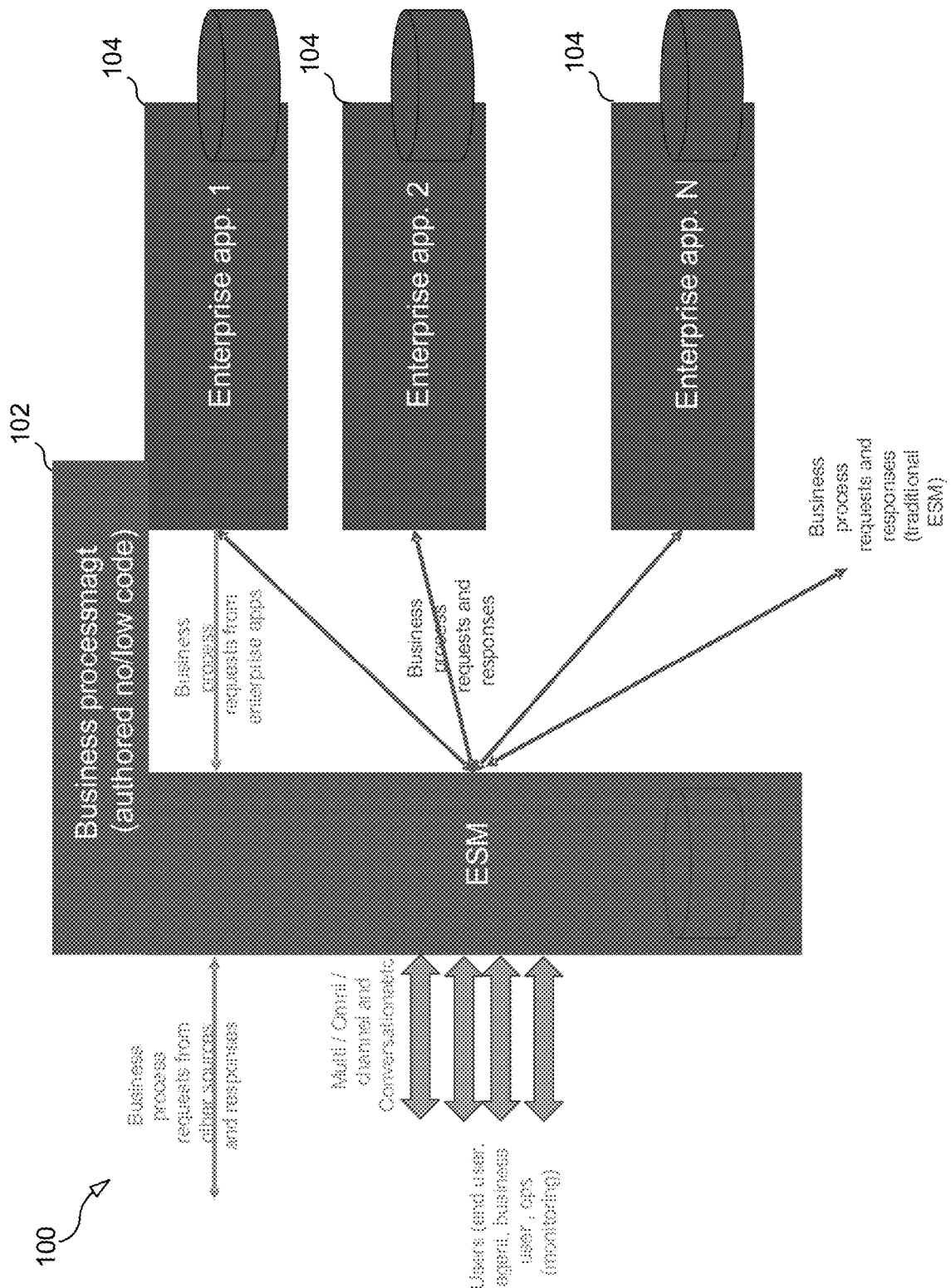
FIG. 1 illustrates a system for providing enterprise and information technology services management orchestrating a plurality of enterprise applications according to some aspects.

FIG. 1 illustrates a system 100 according to some aspects. In some aspects, the system 100 may include a system 102 for providing enterprise and information technology services management orchestrating a plurality of enterprise applications, referred to herein as an enterprise service management (ESM) system 102. In some aspects, as shown in FIG. 1, the system 100 may include one or more enterprise applications 104. In some aspects, the ESM system 102 may front-end the one or more enterprise applications 104.

In some aspects, the ESM system 102 may implement ITIL practices, including that it may trigger one or more business processes that may run on their own (e.g., the one or more business processes may not call any of the one or more enterprise applications 104). In some aspects, the one or more business processes may involve agents (e.g., people dealing with a user, part of the request fulfillment), processes, and/or requests to different departments. In some aspects, the one or more business processes may additionally or alternatively trigger call(s) to one or more of the enterprise applications 104 and track the outcome and status of the processes (e.g., including within the enterprise applications 104). In this way, the ESM system 102 may orchestrate the one or more enterprise applications 104. Upon completion of a process passed to an enterprise application 104, the business process may continue (and the ESM system 102 may be aware of outcome and status) or return to the ESM system 102 (synchronously or asynchronously) with the ESM system 102 then initiating another process (which could also be seen as a next branch) with possible calls to same or other enterprise applications 104.

In some aspects, the ESM system 102 may implement an Application Integration Architecture (AIA) pattern in which the orchestrator is the ESM system 102 with the process associated to the request at hand. In some aspects, the ESM system 102 may be fundamentally driven by a user (e.g., end user, agent, approver, or business user) facing with a multi-omni self-service interface (and possibly conversational with AI/smartness) (e.g., instead of, for example, BPEL). In some aspects, the processes may be developed via low code/no code, for internal processes, external processes or call, via an integration framework to external applications (like 104). In some aspects, the processes may be well defined, captured in catalogs (e.g., which may define what can be done and/or asked), predictable, and/or manageable. In some aspects, the ESM system 102 may provide an ESM/ITSM experience and support ITIL practices and processes.

In some aspects, the ESM system 102 may expose its own application programming interfaces (APIs). In some aspects, the APIs may receive the results of a request (e.g., pub subscription, push, pull, or listening). In some aspects, the APIs may additionally or alternatively enable a "request" to be similarly triggered from other applications (e.g., a customer application or one of the company's enterprise applications 104). In some aspects, enabling a request to be triggered from other applications may enable other services, applications or processes to trigger the ESM business processes that can be built low/no code, which may enable any enterprise process to be implemented.

In some aspects, the ESM system 102 may include smartness and/or AI, which may provide the ability to: autonomously complete (e.g., author, update, customize, and/or parametrize) business processes and/or autonomously select what process to use (e.g., for a request as well as for an issue, or when an application needs to interact with another application), and/or the smartness and/or AI may result in a fully autonomous enterprise (for its managing and auto healing all its processes).

Figure 2:
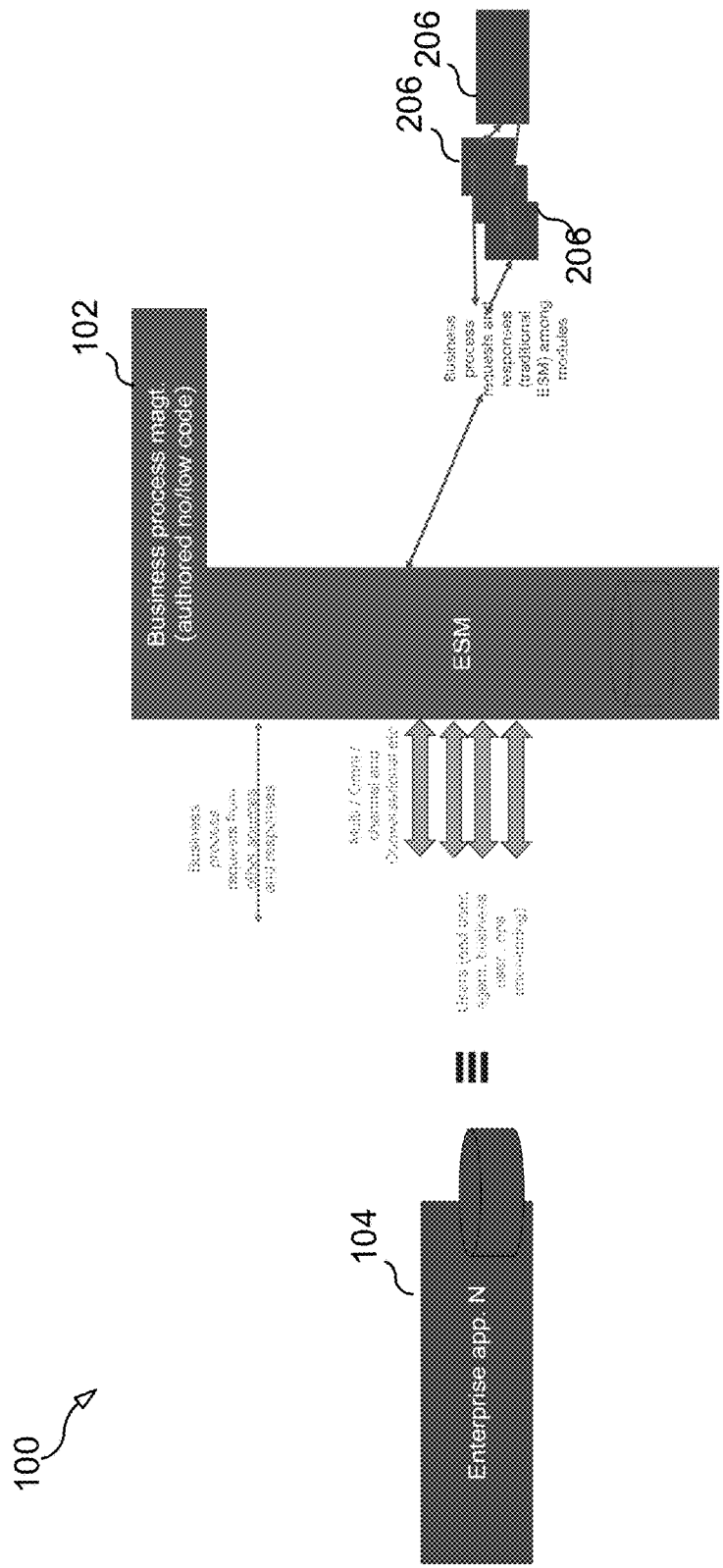
FIG. 2 illustrates a system for providing enterprise and information technology services management orchestrating a plurality of enterprise applications according to some aspects.

In some aspects, as shown in FIG. 2, the system 100 may be used to re-implement aspects of one or more particular enterprise applications 104, which may include domain specific and/or industry specific business processes. In some aspects, as shown in FIG. 2, the ESM system 102 may trigger business process requests and responses among one or more modules 206. In some alternative aspects, as shown in FIG. 3, the system 100 may extract from, and reuse (or re-architecture to micro services etc.) an enterprise application 104 so that some of these expert functions and processes may be reused while other internal flow may be redone with the ESM system 102 (e.g., using one or more modules 206).

Figure 3:
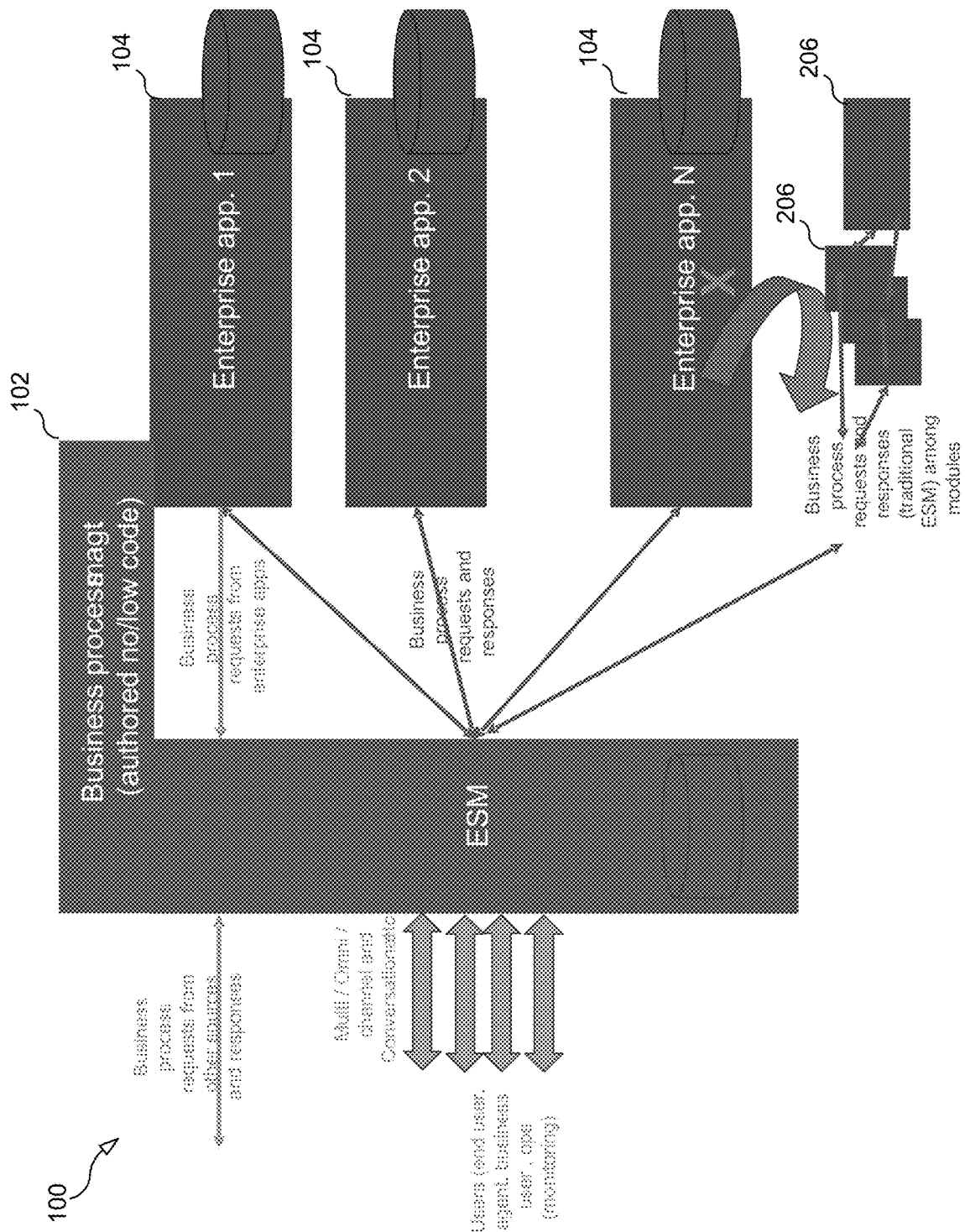
FIG. 3 illustrates a system for providing enterprise and information technology services management orchestrating a plurality of enterprise applications according to some aspects.

In some aspects, the one or more modules 206 of FIGS. 2 and 3 may be one or more services exposed by enterprise applications 104 (e.g., certain functions the enterprise applications 104 expose and/or micro services) and/or one or more stand-alone services. In some aspects, one or more services may provide equivalent capabilities to those of an enterprise application and, therefore, may replace the enterprise application and/or customize some of the enterprise application's capabilities. As shown in FIG. 3, the one or more modules/services 206, which may be triggered by ESM system 102, may replace and/or complement one or more enterprise application 104. As shown in FIG. 2, the one or more modules/services 206, which may be triggered by ESM system 102, may replace all of the enterprise application 104. Accordingly, FIG. 2 shows a new way to implement the one or more enterprise applications 104 using the one or more modules/services 206, and FIG. 3 shows using the one or more modules/services 206 to compliment and/or replace one or more enterprise applications 104.

Figure 4:
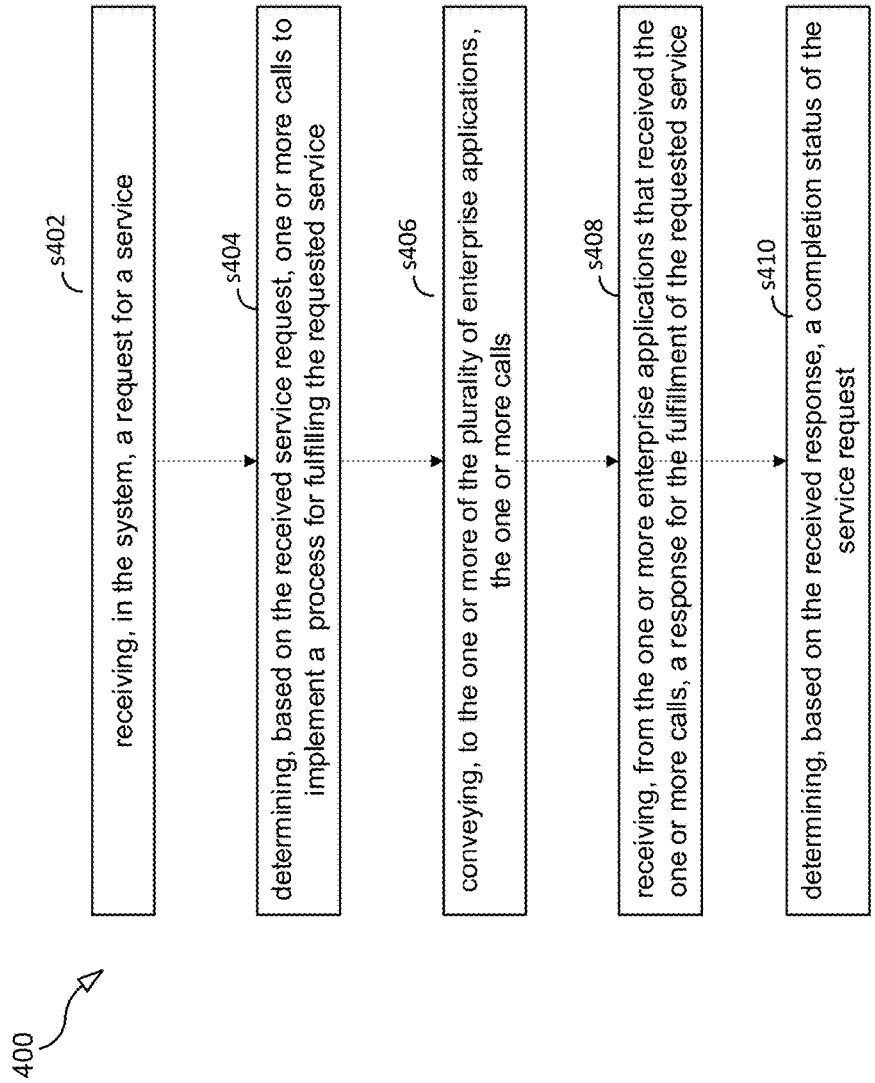
FIG. 4 is a flow diagram illustrating a process according to some aspects.

FIG. 4 is a flowchart illustrating a process according to some embodiments. The process 400 of FIG. 4 is a computer implemented method performed by a system for providing enterprise and information technology services management orchestrating a plurality of enterprise applications. Process 400 may begin with step s402.

Step s402 comprises receiving, in the system, a request for a service. In some embodiments, a request for a service can be done manually by a user through any of the channels or via APIs by another system.

Step s404 comprises determining, based on the received service request, one or more calls to implement a process for fulfilling the requested service.

Step s406 comprises conveying, to the one or more of the plurality of enterprise applications, the one or more calls.

Step s408 comprises receiving, from the one or more enterprise applications that received the one or more calls, a response for the fulfillment of the requested service.

Step s410 comprises determining, based on the received response, a completion status of the service request.

In some embodiments, the process implemented by the one or more calls includes a process internal to the system, a process externally defined via a workflow, and/or a process of one or more of the plurality of enterprise applications possibly realized through an integration framework and adapters to each enterprise application. In some embodiments, the method includes performing a workflow, wherein performance of the workflow is triggered by the received request and conveying, to the one or more of the plurality of enterprise applications, the one or more calls is triggered by the workflow.

In some embodiments, the method includes, if the determination of the completion status of the service request is that the request status is incomplete: (i) determining, based on the received response, one or more additional calls to implement an additional process for fulfilling the requested service; (ii) conveying, to the one or more of the plurality of enterprise applications, the additional one or more calls; (iii) receiving, from the one or more enterprise applications that received the one or more additional calls, an additional response for fulfillment of the requested service; (iv) determining, based on the received additional response, an updated completion status of the service request; and repeating steps (i) to (iv) until the updated completion status of the service request is that the request status is complete.

In some embodiments, the method includes performing a workflow, wherein performing the workflow is triggered by the received response and conveying, to the one or more of the plurality of enterprise applications, the one or more additional calls is triggered by the workflow. In some embodiments, the workflow performed is a new workflow or may be a continuation of an existing workflow.

In some embodiments, the requested service involves one or more of creation of, knowledge of, management of, optimization of, clarification of, request for, support for, or access to information, a service offered in a catalog, and/or a business process.

In some embodiments, the plurality of enterprise applications are software applications that relate to business processes of an enterprise, wherein each business process is specific to a particular domain of an enterprise and wherein the particular domain is any of: Information Technology (IT), DevOps, Security, Procurement, Human Resources (HR)/talent and recruitment, Facility management, Enterprise Resource Planning (ERP), Customer Relations Management (CRM), procurement, travel, partner management, customer management, Field service management, enterprise asset management, and/or financials, and other OSS or BSS systems.

In some embodiments, the received request for service is made by a user through any of: a self-service omni-channel portal, a collaboration software system, a mobile application, an Internet application, a client application, a multi-modal channel, an omni-channel, a voice message, a video message, a text based message, a selection from a catalog of user requests, using a graphical user interface (GUI), and/or using a chat bot, a virtual agent, a conversational system, bot or a human agent making a request on behalf of the user.

In some embodiments, the user that made the received request for service is empowered to continue to use a selected business process specific to a particular domain of the enterprise, if they prefer so, while other users of the system are not required to continue to use the selected business process specific to the particular domain for the requested service. In some embodiments, the other users of the system can use any of the enterprise applications for requesting service through the self-service omni-channel portal.

In some embodiments, users can at any time decide (if they prefer in general or for a specific request, or be prompted if a service is implemented that way) to use and/or go use a specific enterprise application. Some classes of users can use a preferred enterprise application (e.g. devops tool chain and work management like Jira), that has its process updating and updated by ESM, so that other users (e.g. business users, product management etc) can use ESM to manage R&D.

In some embodiments, the plurality of enterprise applications includes a customer relationship management (CRM) application, a human resources (HR) application, an enterprise resource planning (ERP) application, a project management application, a data services application, a marketing and/or sales application, an IT application, a support application, a finance and/or accounting application, a pre-sale application, a purchasing and/or procurement application, or a partner management application, a customer management application, Field service management, enterprise asset management, OSS, BSS, travel, procurement, devOps/development tool chain. In some embodiments, the method includes performing a workflow, wherein the workflow is designed using a low code/no code graphical user interface (GUI) or by combining one or more existing workflows saved in a catalog, rather than by coding.

In some embodiments, the received request for a service is self-service from a user and the fulfillment of the requested service is to the user.

In some embodiments, the request for service received in the system is through an application programming interface (API) call from any of: an enterprise application, a business process, and/or a service within the system, and/or from one or more external systems.

In some embodiments, one or more of the steps includes using artificial intelligence (AI), wherein the AI includes a machine learning (ML) model, and wherein using AI enables any of: autonomously completing a business process, including while interacting with a user; interpreting a request or response; determining which of the plurality of enterprise applications to call; determining the cause of an error through root cause analysis; making recommendations to remediate an error; implementing conversational and natural language interfaces; implementing advanced searches to support a request or response; analyzing reports and autonomous fulfillment of a request (including optimized routing to best application or agent to deal with it); monitoring request status; predicting and detecting problems in the system; and/or implementing solutions to detected problems.

In some embodiments, the received request for a service is from a user, and the method includes prompting the user, from the system, via a prompt or response/update of a page, in the event the user is available on a web application, or in a chat, or by sending a notification, with a follow-up request for interaction by the user, wherein the request for interaction was conveyed by one or more of the plurality of enterprise applications or by the system in connection with fulfillment of the requested service; receiving, in the system, a user answer; determining, based on the user answer, one or more next steps in a workflow, including one or more additional calls to one or more of the plurality of enterprise applications for fulfillment of the requested service; and conveying, to the one or more of the plurality of enterprise applications, the one or more additional calls for fulfillment of the requested service based on the user answer.

In some embodiments, the method includes receiving, in the system, a request for external system interaction conveyed by an enterprise application; conveyed through an application programming interface (API) call to an external system; receiving, in the system, a response conveyed by the external system; and conveying a response to the request for external system interaction to the enterprise application.

Figure 5:
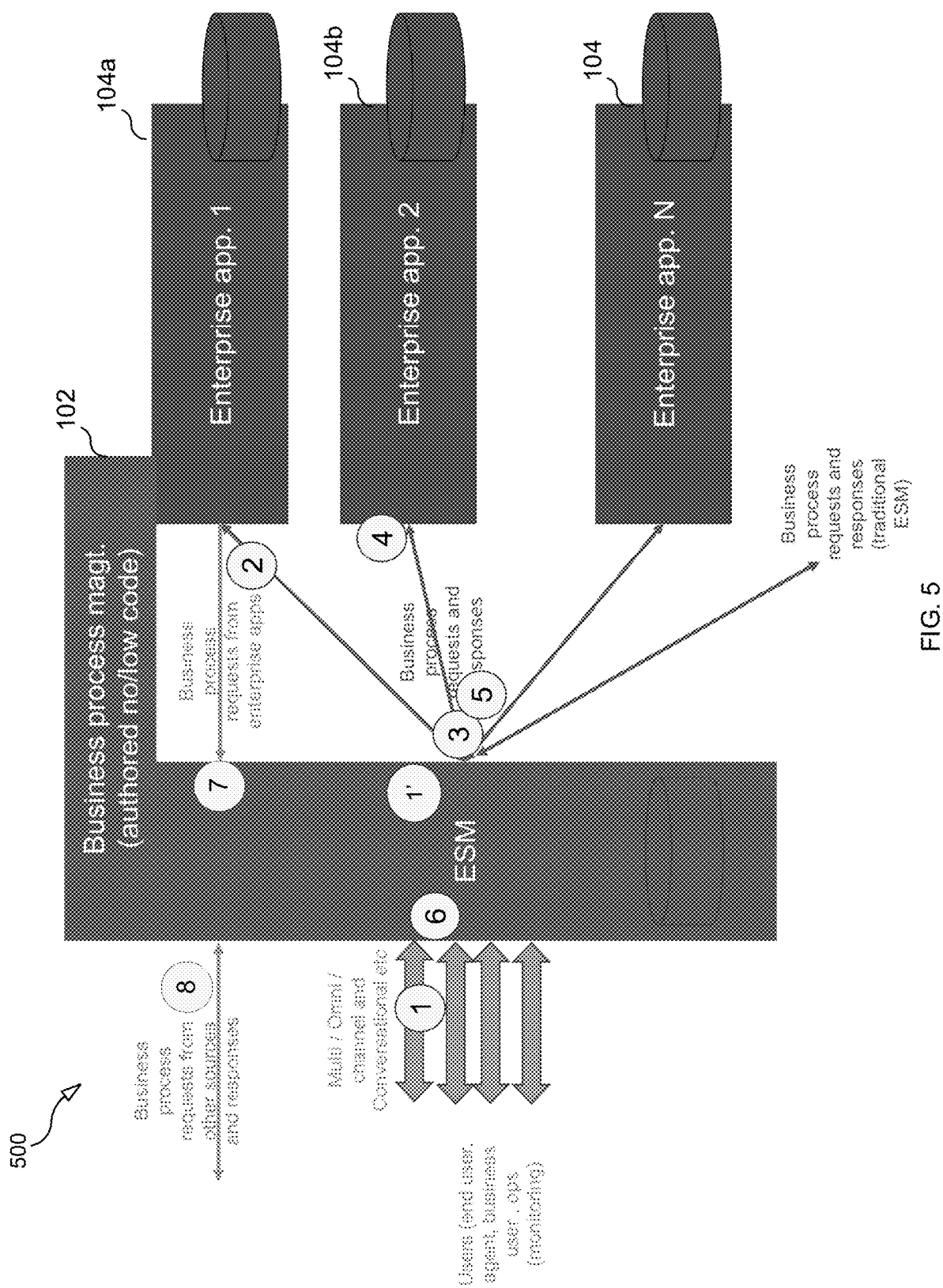
FIG. 5 is a flow diagram illustrating a process according to some aspects.

FIG. 5 illustrates a process 500, which may be performed by the system 100, according to some aspects. In some aspects, the process 500 may include a step (1) in which the ESM system 102 receives a user request. At step (1), as illustrated, there are interactions between users (e.g., end user, agent, business user, ops) or monitoring, and the ESM system through multi/omni/channel and conversational and the like. In some aspects, the process 500 may include a step (1') in which the ESM system 102 performs a workflow triggered by the user request received in step (1). In some aspects, the process 500 may include a step (2) in which the ESM system 102 conveys a call to a first enterprise application 104a. In some aspects, the call to the first enterprise application 104a in step (2) may be triggered by the workflow in step (1'). In some aspects, the process 500 may include a step (3) in which the ESM system 102 receives a response from the first enterprise application 104a. In some aspects, the process 500 may include a step (4) in which the ESM system 102 conveys a call to a second enterprise application 104b. In some aspects, the call to the second enterprise application 104b in step (4) may be triggered by the response received by the ESM system 104a in step (3). In some aspects, the process 400 may include a step (5) in which the ESM system 102 receives a response from the second enterprise application 104b. Steps (1'), (2), (3), (4), and (5), as illustrated, show business process requests and responses between the ESM system and enterprise applications. In some aspects, the process 500 may include additional steps in which the ESM system 102 conveys calls (to one or more enterprise applications 104 and/or outside the enterprise) and receives responses thereto. In some aspects, the process 500 may include a step (6) in which the ESM system 102 confirms completion of workflow (or error) to user. In some aspects, the process 500 may include a step (7) in which business process requests from enterprise applications 104 are made to the ESM system 102. In some aspects, the process 500 may include a step (8) in which business process requests from other external sources are made to the ESM system 102.

In some aspects, the ESM system 102 may perform a process similar to the process 500 except that an API call to the ESM system 102 from another system (within or outside enterprise at step (8)) triggers the request workflow (instead of the user triggering the workflow). In some aspects, the other system may be, for example, an enterprise application 104 or another process or external service. In some aspects, confirmation of workflow completion (or error) may be conveyed to the system that requested the workflow.

Figure 6:
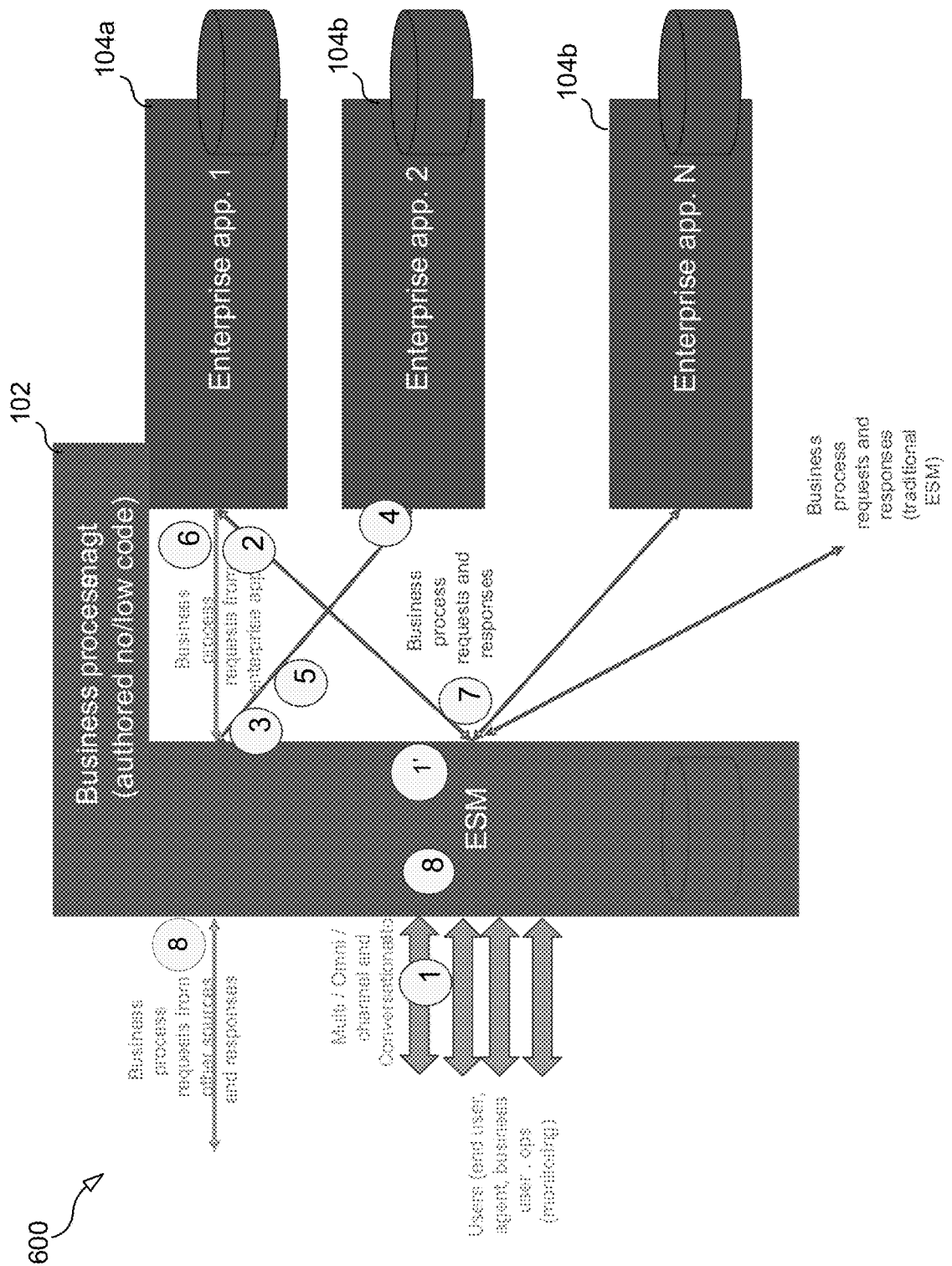
FIG. 6 is a flow diagram illustrating a process according to some aspects.

FIG. 6 illustrates a process 600, which may be performed by the system 100, according to some aspects. In some aspects, the process 600 may include a step (1) in which the ESM system 102 receives a user request. In some aspects, the process 600 may include a step (1') in which the ESM system 102 performs a workflow triggered by the user request received in step (1). In some aspects, the process 600 may include a step (2) in which the ESM system 102 conveys a call to a first enterprise application 104a. In some aspects, the call to the first enterprise application 104a in step (2) may be triggered by the workflow in step (1'). In some aspects, in response to the call conveyed by the ESM system 102 in step (2), the first enterprise application 104a may need to delegate a request to one or more other enterprise applications. In some aspects, the process 600 may include a step (3) in which the ESM system 102 receives a call (e.g., an API call) from the first enterprise application 104a. In some aspects, the process 600 may include a step (4) in which the ESM system 102 performs a new request workflow. In some aspects, the new request workflow may be triggered by the call received in step (3). In some aspects, in performing the new request workflow, the ESM system 102 may convey one or more calls to one or more second enterprise applications 104b and/or outside the enterprise. In some aspects, the process 600 may include a step (5) in which the ESM system 102 receives one or more responses to the one or more calls conveyed in step (4) (or error). In some aspects, steps (4) and (5) may proceed until completion of the delegated workflow (or error). In some aspects, the process 600 may include a step (6) in which the ESM system 102 conveys a response to the first enterprise application 104a. In some aspects, the process 600 may include a step (7) in which the ESM system 102 receives a response (e.g., to the call conveyed in step (2)) from the first enterprise application 104a. In some aspects, the process 600 may include additional steps in which the ESM system 102 conveys calls (to one or more enterprise applications 104 and/or outside the enterprise) and receives responses thereto. In some aspects, the process 500 may include a step (8) in which the ESM system 102 confirms completion of workflow (or error) to user. The process illustrated in FIG. 6 differs from the process illustrated in FIG. 5 in that, in the process illustrated in FIG. 6, when the enterprise application 104a responds to the ESM system 102 at step 3, another call is made to another enterprise application 104b, at step 4, and then the result is passed to the ESM system 102 and then the result returned from the ESM system 102 to the user.

In some aspects, the ESM system 102 may perform a process similar to the process 600 except that an API call to ESM system 102 from another system (within or outside the enterprise), at step (8), triggers the request workflow (instead of the user triggering the workflow). In some aspects, the other system may be, for example, an enterprise application 104 or another process or external service. In some aspects, confirmation of workflow completion (or error) may be conveyed to the system that requested the workflow.

Figure 7:
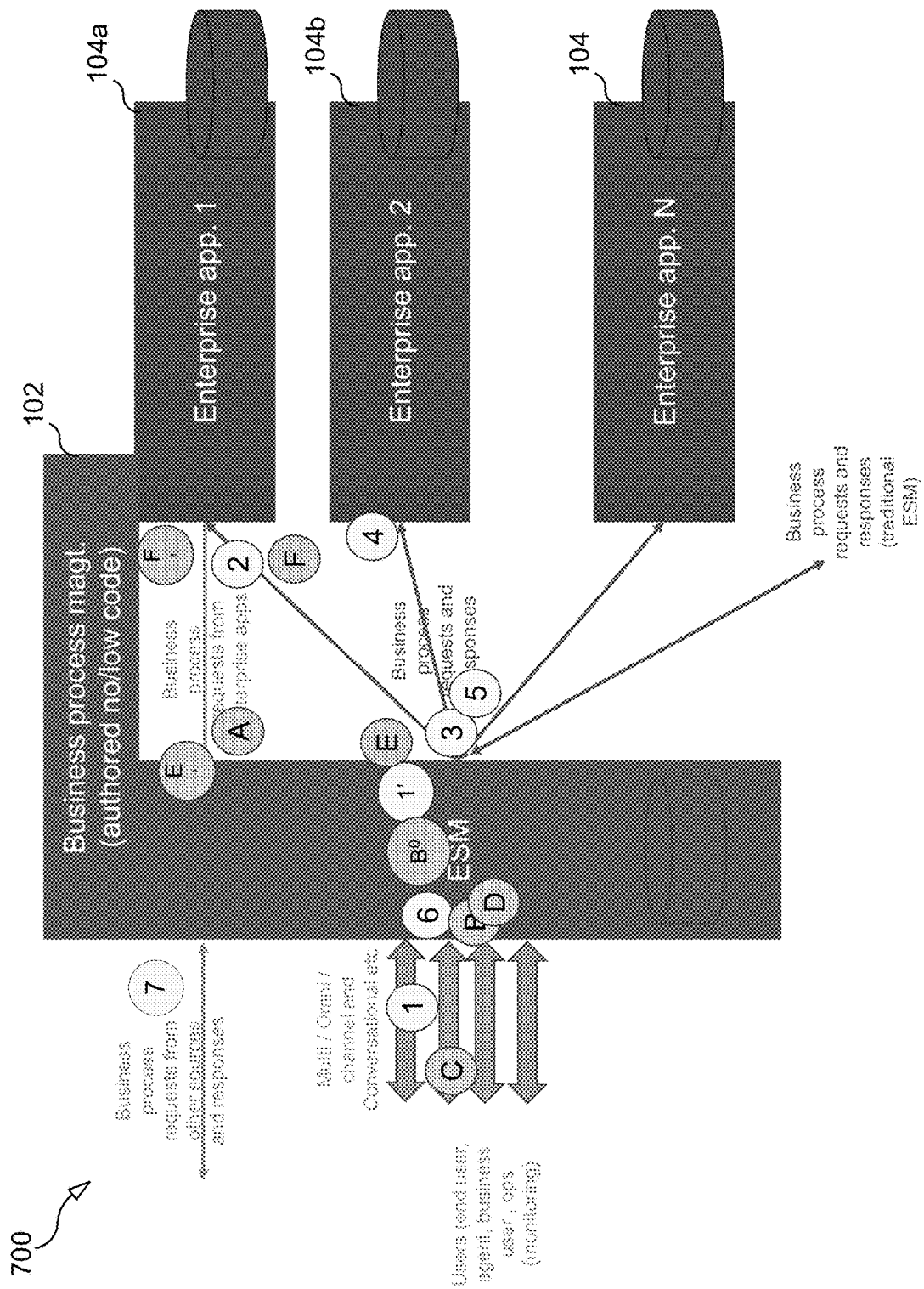
FIG. 7 is a flow diagram illustrating a process according to some aspects.

FIG. 7 illustrates a process 700, which may be performed by the system 100, according to some aspects. The process 700 may be similar to the process 500 or 600 except that the involved enterprise (e.g., first enterprise application 104a) must interact with the user to complete its on-going task in the workflow. In some aspects, the process 700 may include a step (1) in which the ESM system 102 receives a user request. In some aspects, the process 700 may include a step (1') in which the ESM system 102 performs a workflow triggered by the user request received in step (1). In some aspects, the process 700 may include a step (2) in which the ESM system 102 conveys a call to a first enterprise application 104a. In some aspects, the call to the first enterprise application 104a in step (2) may be triggered by the workflow in step (1'). In some aspects, the process 700 may include a step (A) in which the ESM system 102 receives a request for user interaction from the first enterprise application 104a. In some aspects, the process 700 may include a step (B) in which the ESM system 102 provides a response/next step to the request to be filled by user. In some aspects, in step (B), the ESM system 102 may provide to the user a form to be filled by the user (and/or other interactions or presented later after notification of the user asking the user to connect to ESM). In some aspects, the process 700 may include a step (B0) in which the ESM system 102 uses a pre-existing form for this purpose or generates dynamically the form used to obtain the information requested by the first enterprise application 104a. In some aspects, the process 700 may include a step (C) in which the ESM system 102 receives a user answer (e.g., to one or more requests in the form) and/or confirmation of execution of human workflow then confirms. In some aspects, the process 700 may include a step (D) in which the ESM system 102 conveys a response request to the first enterprise application 104a. In some aspects, the response request may be conveyed and received as a new request match to the initial session (see steps (E), (F)) or as response to the request received in step (A) (see steps (E'), (F')). In some aspects, in step (B), the ESM system 102 may notify users in any of many different ways. In FIG. 7, as illustrated, when a response is received in the ESM system 102 from one or more of the enterprise applications 104, the response may include a prompt to the user, for example, for additional information. In response, the user may provide the additional information, for example, through a channel (e.g., multi, omni channel), after which the workflow continues.

In some aspects, the process 700 may include a step (3) in which the ESM system 102 receives a response from the first enterprise application 104a. In some aspects, the process 700 may include a step (4) in which the ESM system 102 conveys a call to a second enterprise application 104b. In some aspects, the call to the second enterprise application 104b in step (4) may be triggered by the response received by the ESM system 104a in step (3). In some aspects, the process 700 may include a step (5) in which the ESM system 102 receives a response from the second enterprise application 104b. In some aspects, the process 700 may include additional steps in which the ESM system 102 conveys calls (to one or more enterprise applications 104 and/or outside the enterprise) and receives responses thereto. In some aspects, the process 700 may include a step (6) in which the ESM system 102 confirms completion of workflow (or error) to a user. In some aspects, in the process illustrated in FIG. 7, the initial step/request may come from a user, illustrated at step (1), or external systems, illustrated at step (7), to trigger a request.

Figure 8:
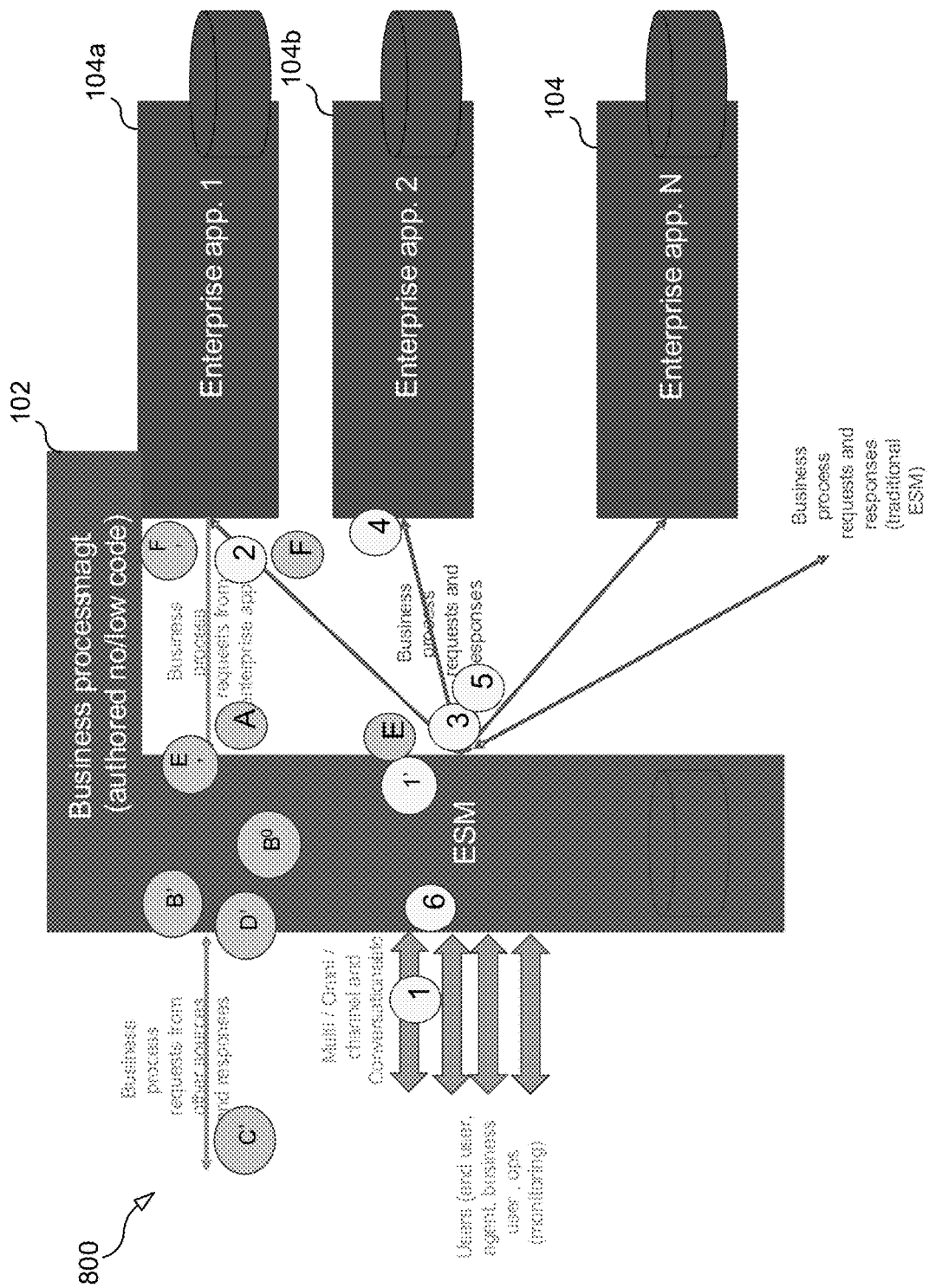
FIG. 8 is a flow diagram illustrating a process according to some aspects.

FIG. 8 illustrates a process 800, which may be performed by the system 100, according to some aspects. The process 800 may be similar to the process 700 except that, instead of delegating to the user in steps (B) thru (D), the request is delegated via API to one or more external systems in API call step (B'), response receiving step (C'), and response conveying step (D'). The process illustrated in FIG. 8 differs from the process illustrated in FIG. 7, in that, in the process illustrated in FIG. 8, at steps (B') and (C'), the prompt is to the external system and, in addition, the initial call could be from an external system and not a user.

Figure 9:
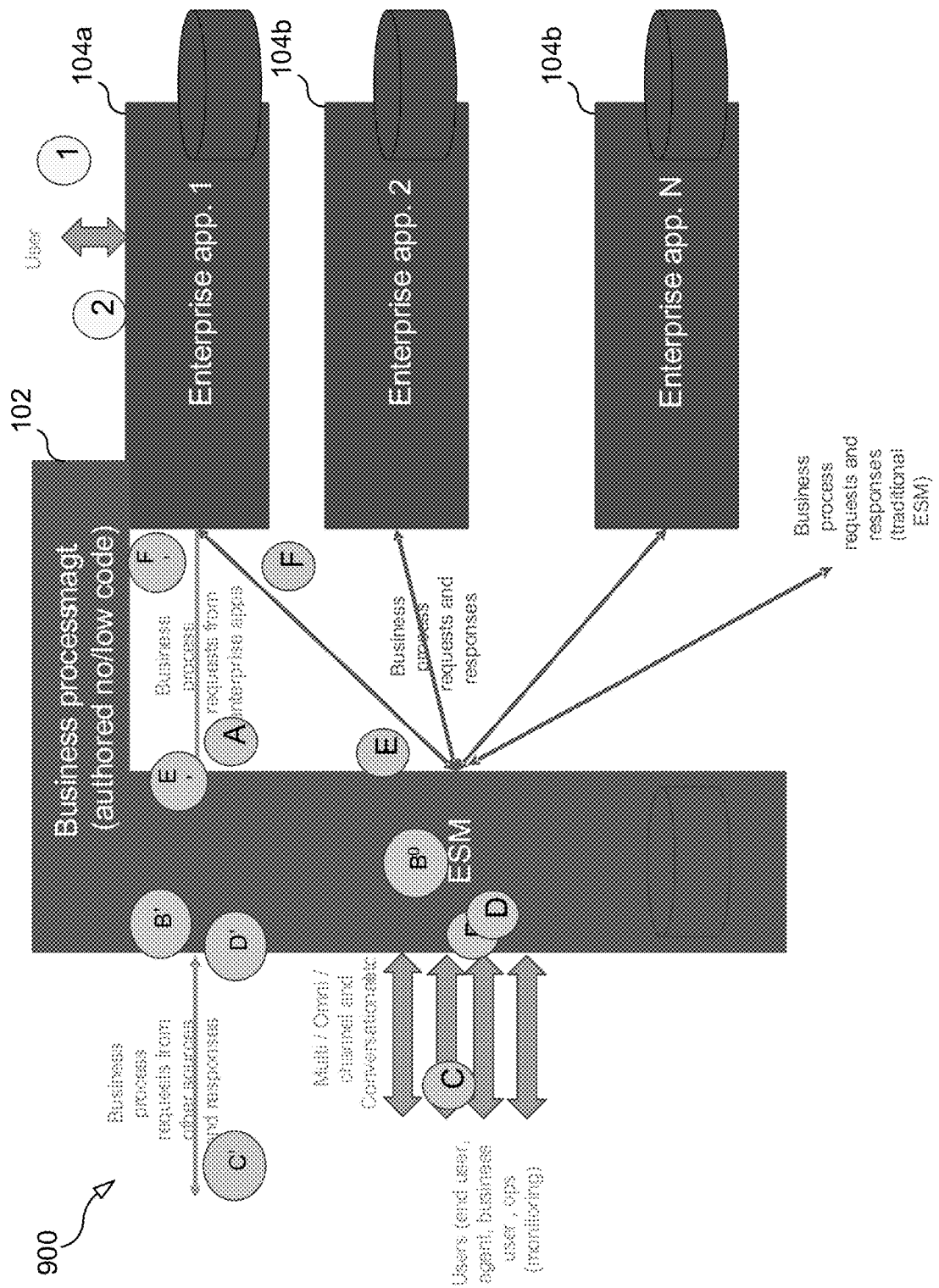
FIG. 9 is a flow diagram illustrating a process according to some aspects.

FIG. 9 illustrates a process 900, which may be performed by the system 100, according to some aspects. The process 900 may be similar to the process 700 or 800 except that a user of the first enterprise application 104a interacts with the first enterprise application 104 and causes the first enterprise application 104 to trigger delegation to one or more other users (e.g., of the ESM system 102) in step (B) and/or one or more applications in step (B'). In the process illustrated in FIG. 9, the triggering initially could be done from interacting from an enterprise application, for example enterprise application 104a, that then starts and/or continues a request from the ESM system 102 by calling (as if an external system, which, for example, could synchronize data and/or notify of a data change). The process illustrated in FIG. 9, may also have later prompts to a user or external systems (that could also be the original or another enterprise application where the user could also interact to answer the prompt if applicable, e.g., approval could be done in the ESM system or in the enterprise application).

Figure 10:
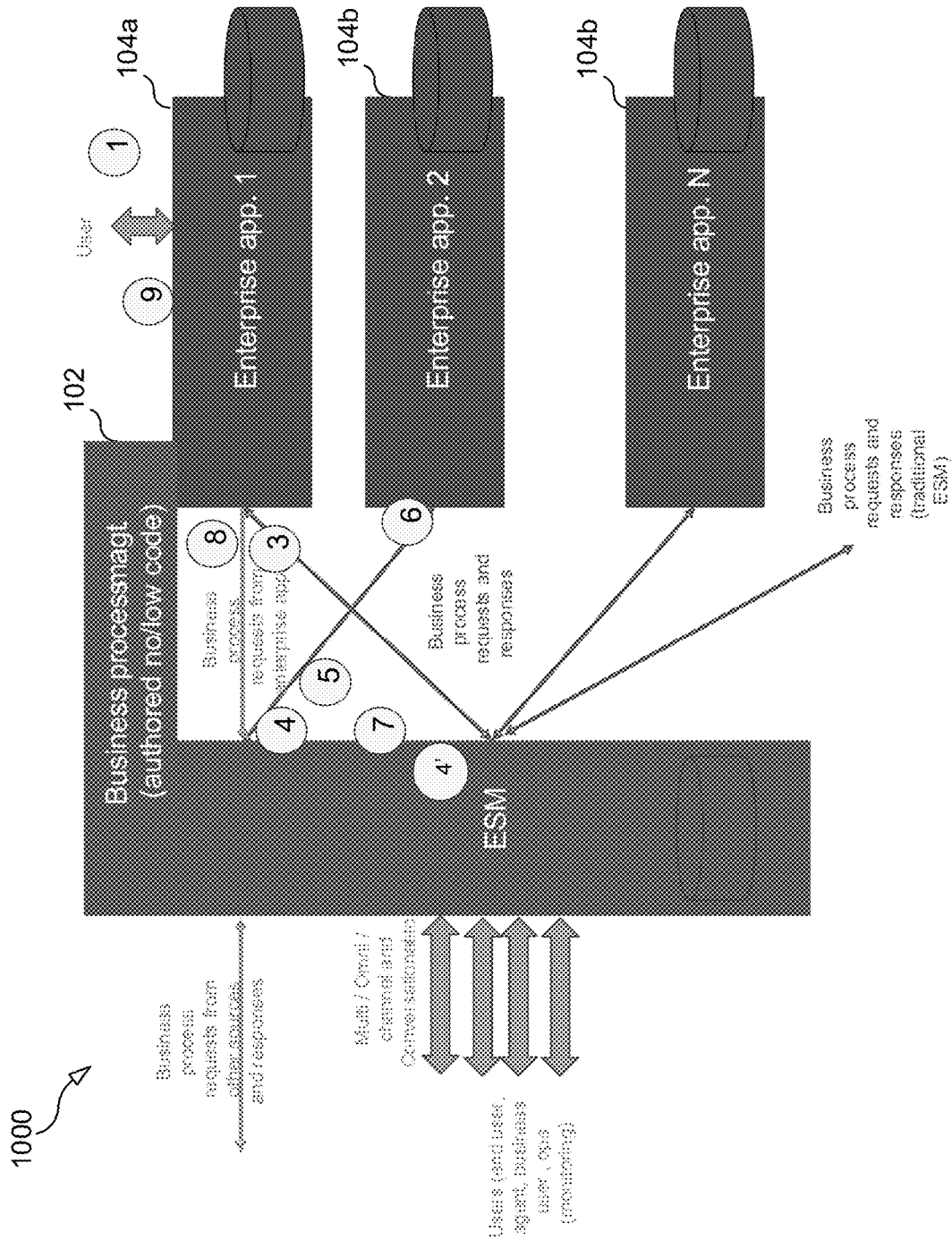
FIG. 10 is a flow diagram illustrating a process according to some aspects.

FIG. 10 illustrates a process 1000, which may be performed by the system 100, according to some aspects. The process 1000 may be similar to the process 600 except that a user of the first enterprise application 104a triggers an ESM request to one or more other enterprise applications 104b. The process illustrated in FIG. 10 is the same as in FIG. 9, but does not involve prompting, and if interacting just with enterprise application(s), a final outcome could be presented there (or viewed from there) instead of from the ESM system (if preferred by the user).

In some alternative aspects, a process may be similar to the process 900 except that a user of the first enterprise application 104a delegates to one or more humans and/or one or more other systems.

In some aspects, the delegation to one or more other users (e.g., in process 900), the delegation to one or more other enterprise applications 104b (e.g., in process 1000), and/or the delegation to one or more humans and/or one or more other systems may be triggered through APIs in enterprise applications from other systems or can be due to scheduled task or other "wake up" of the first enterprise application 104a.

In some aspects, when the enterprise application 104 interaction with ESM system 102 requires user input via UI, the new form presented to the user may be generated via screen scraping or rebuilt (possibly in the new form, possibly also with AI). In some aspects, enterprise applications 104 that do not offer a simple API/adapter may additionally or alternatively be interacted with through RPA (Robotic Process Automation). Similarly, in some aspects, forms may be built with the fields requested in an API reply or event for the user (or another process) to fill when prompted or when done with a human workflow task.

In some aspects, in the processes disclosed herein, the ESM system 102 may understand the input and what workflow to best trigger. Based on the nature of the input and context (e.g., a certain user asking by speech or natural language), the ESM system 102 may auto fill part of the request and sometimes also decide what best target enterprise application 104 to select (e.g., if multiple instances could be involved and/or when human steps could be involved (original user or say other agent or an operator). The ESM system 102 may select which to notify (one or many) based on, for example, the nature of request, context, skills, history of actions, and/or work load schedule). In some aspects, workflows may be either pre-built or automatically generated based on the intent behind the request (from user or from another application or external system).

In some aspects, in the processes disclosed herein, when a workflow is triggered, one can monitor end to end its execution (IT completion, error, stuck somewhere etc). In some aspects, when a problem occurs, the ESM system 102 may be able to determine the root cause (e.g., application down, too much load, process error, network down, database error, no responsive user, user away etc. . . . ) and notify ops or user or relevant party (automatically determined when required) about the problem, along with suggestion to remediate or sometimes even self-remediate (e.g., reset application, repeat request (and ensure no duplication) or route to other user or system, scale out application, re-notify approver, etc). Errors may therefore also optimally handled (reiterated or notified to the best suited user (e.g. end user or Ops)). Policy violation and security concerns may similarly be handled.

In some aspects, in the processes disclosed herein, when designing the business processes, e.g. low code/no code, the ESM system 102 can auto generate the, or portions, or structure of the workflow to interact with a set of applications or external systems or users based on intent and nature of the known/discovered APIs. This reduces the effort for designer who needs to review, accept or customize the result.

In some aspects, in the processes disclosed herein, the ESM system 102 may be self-healing as are all the applications 104 and systems involved.

In some aspects, in the processes disclosed herein, the users can interact with the ESM system 102 and with knowledge management (KM) through any channel and rely on conversations (or messages) and virtual agents to get the request understood and marshalled until completion.

Figure 11:
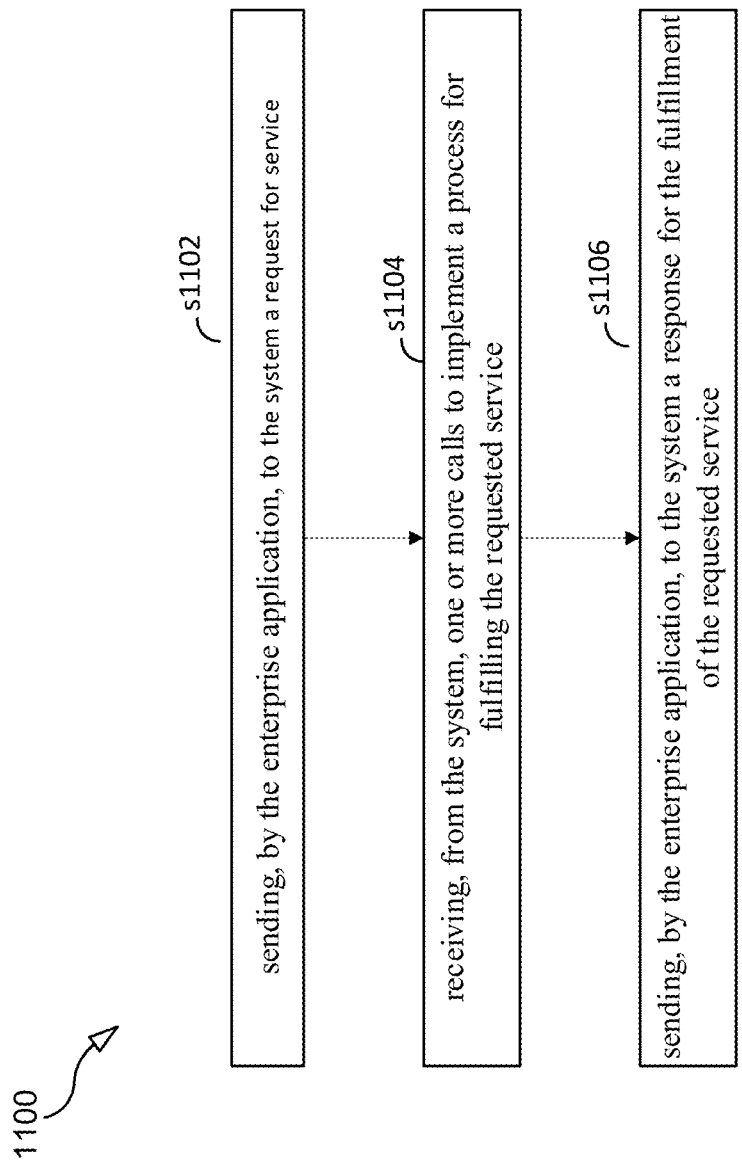
FIG. 11 is a flow diagram illustrating a process according to some aspects.

FIG. 11 is a flowchart illustrating a process according to some embodiments. The process 1100 of FIG. 11 is a computer implemented method performed by an enterprise application in communication with a system for providing enterprise and information technology services management orchestrating a plurality of enterprise applications. Process 1100 may begin with step s1102.

Step s1102 comprises sending, by the enterprise application, to the system a request for service.

Step s1104 comprises receiving, from the system, one or more calls to implement a process for fulfilling the requested service; and Step s1106 comprises sending, by the enterprise application, to the system a response for the fulfillment of the requested service.

In some embodiments, the plurality of enterprise applications are software applications that relate to business processes of an enterprise, wherein each business process is specific to a particular domain of an enterprise and wherein the particular domain is any of: Information Technology (IT), DevOps, Security, Procurement, Human Resources (HR)/talent and recruitment, Facility management, Enterprise Resource Planning (ERP), Customer Relations Management (CRM), procurement, travel, partner management, customer management, Field service management, enterprise asset management, and/or financials, and other OSS or BSS systems.

In some aspects, the system 100 may include one or more of the following:
  (i) Smartness of ESM (understand input, Understand request (tickets etc), route/select target, Generate workflow (populate, set values or design it when needed).
  (ii) Monitoring of different systems (ESM, Enterprise Apps, Infrastructure, other systems including other parties when things are delegated to them).
  (iii) Analyze reported problems, detects problems before they are reported or better yet Predict problems and notify best party or notify with remediation suggestion best party or remediated and notify best party of what was done.
  (iv) Monitor workflow and notify of issue or take action to remediate and notify about what was done to best party. May even proactively predict issue (system is down, agent is away etc) and modify workflow (or its parameters) to avoid the issue.
  (v) Data about all aspects can be captured in data lakes/warehouse or better yet data mesh. This is used as the data for the training and active se by the AI brain in ESM/ITOM (it goes beyond AIOps as it is autonomous IT and Autonomous management of business processes). This data mesh can be used to generate analytics, reports and dashboards for all stakeholders about all aspects of the running of the enterprise.

In some aspects, the system 100 including the ESM system 102 may provide one or more of the following advantages:
  (i) Providing a new UI, UX experience to all personas/user where they can interact and seek information, support or requests in multi-/omni channel self-service.
  (ii) Automation of all business process within enterprise within organization as well as among to and from enterprise applications that capture and execute domain or industry specific business processes. As such, the invention is at the core of enable digital transformation of enterprises and businesses.
  (iii) Low-code/no code development and customization of the business process, including when involving auto generation of workflows with AI based n intent and needs of known/target APIs. Some can be complex series of requests driven as a conversation.
  (iv) Management of the business process.
  (v) Autonomous execution of end-to-end business processes in an enterprise.
  (vi) Ability to technically rebuild and customize enterprise application via ESM and even ability to build an uber enterprise application (e.g. encompassing all business process for all organization in an enterprise); possible with different variations for different industries where business processes would vary. This would amount to an enterprise in a box (or rather probably a in the cloud enterprise).
  (vii) With respect to AIA and EAI patters, no need of CDM (Common Data Model), although one can be envisaged.
  (viii) ESM, which is a new integration pattern within enterprises, allows users to interact through multi/omni channel and modern UI/UX with all the enterprise applications and business processes. The processes are catalogued (even when automatically generated), predictable especially as monitored for efficient and performing completion and remediation when needed.
  (ix) ESM as enabler of Enterprise digital transformation (DX) for all its processes and services that it uses, and offers to all its stakeholders.
  (x) It is also a new way to develop, customize or use enterprise applications in enterprises: they can introduce new/custom business processes between enterprises and they can build their own.
  (xi) Doing so, it is possible to pry open also an enterprise application and complement it (first) then even replace it by a set of catalogued workflow that amounts to do the same but now can managed, customized and understood more easily by business owners.
  (xii) Across LOBs (lines of business), business owner can publish within a catalog the set of workflow that they make available for interactions/trigger by others. The business owner designing a new business process in a LOB can hook it to the other processes already in the catalog, therefore ensuring setup of end-to-end business processes and value chain across the enterprise where each function associated a LOB can be blessed by the LOB. Visibility of the internals of a LOB process and visibility of the data populated when it runs can then be restricted to the authorized parties (e.g. IT does not see HR details etc). Validation of these workflow ensure also better security and quality of the resulting composed workflow.
  (xiii) Associating roles and access to who authors/own a workflow and who triggers it is also a way to ensure multi-tenant support including in situation where the applications may not be multi-tenant (some workflow execute on behalf of a user with the permissions of a LOB/tenant—some LOBs/tenants can see the data associated to it and some cannot).
  (xiv) Organization specific or industry specific knowledge is contained in LOB workflows or involved applications (e.g. CRM for field/Outbound facing roles, HR for HR, BSS for Telco, FSM for particular industry, ERP with Energy/utility content for Utilities etc). It is an easy way to bring in ESM paradigm to organization specific and industry specific processes. The processes can then be customized as discussed earlier and the knowledge about say a specific industry brought in this way, leading eventually if desired to phasing out a specific app and rather using the catalogued processes.

Figure 12:
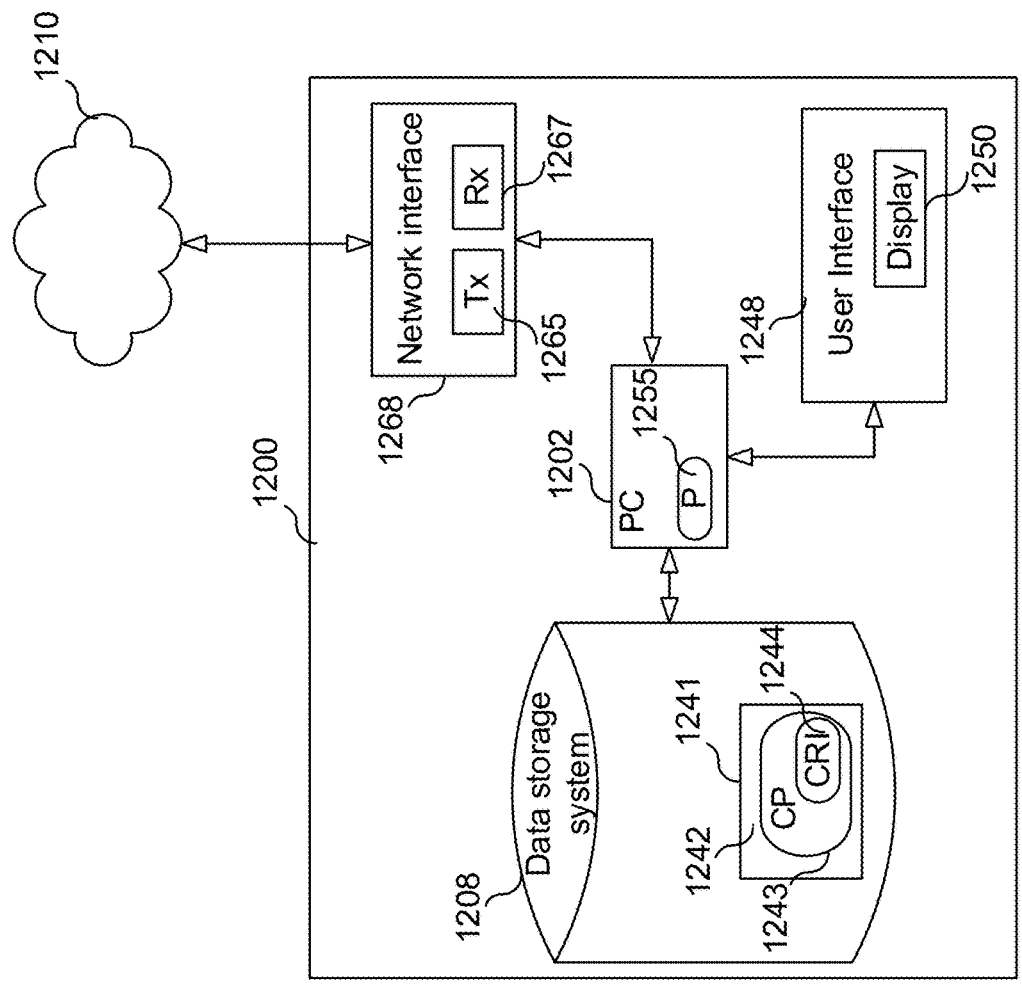
FIG. 12 is a block diagram of an apparatus according to some aspects.

FIG. 12 is a block diagram of an apparatus 1200 apparatus for a system for providing enterprise and information technology services management orchestrating a plurality of enterprise applications according to some aspects. As shown in FIG. 12, the apparatus 1200 may comprise: processing circuitry (PC) 1202, which may include one or more processors (P) 1255 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., the system may be a distributed computing apparatus); a network interface 1268 comprising a transmitter (Tx) 1265 and a receiver (Rx) 1267 for enabling the apparatus 1200 to transmit data to and receive data from other nodes connected to a network 1210 (e.g., an Internet Protocol (IP) network) to which network interface 1268 is connected; a user interface 1248, which may include a display 1250; and a local storage unit (a.k.a., "data storage system") 1208, which may include one or more non-volatile storage devices and/or one or more volatile storage devices. In aspects where PC 1202 includes a programmable processor, a computer program product (CPP) 1241 may be provided. In some aspects, the CPP 1241 may include a computer readable medium (CRM) 1242 storing a computer program (CP) 1243 comprising computer readable instructions (CRI) 1244. In some aspects, the CRM 1242 may be a non-transitory computer readable medium, such as, magnetic media (e.g., a hard disk), optical media, memory devices (e.g., random access memory, flash memory), and the like. In some aspects, the CRI 1044 of computer program 1243 may be configured such that when executed by PC 1202, the CRI causes the apparatus 1200 to perform steps described herein (e.g., one or more steps described herein with reference to the flow diagrams herein). In other aspects, the apparatus 1200 may be configured to perform steps described herein without the need for code. That is, for example, the PC 1202 may consist merely of one or more ASICs. Hence, the features of the aspects described herein may be implemented in hardware and/or software.

In some embodiments, there is provided a system for providing enterprise and information technology services management orchestrating a plurality of enterprise applications. The system includes processing circuitry; and a memory, the memory containing instructions executable by the processing circuitry, whereby the system is configured to receive, in the system, a request for a service; determine, based on the received service request, one or more calls to implement a process for fulfilling the requested service; convey, to the one or more of the plurality of enterprise applications, the one or more calls; receive, from the one or more enterprise applications that received the one or more calls, a response for the fulfillment of the requested service; and determine, based on the received response, a completion status of the service request.

In some embodiments, there is provided a system for providing enterprise and information technology services management orchestrating a plurality of enterprise applications in communication with an enterprise application, comprising processing circuitry; and a memory, the memory containing instructions executable by the processing circuitry, whereby the system is configured to send, by the enterprise application, to the system a request for service; receive, from the system, one or more calls to implement a process for fulfilling the requested service; and send, by the enterprise application, to the system a response for the fulfillment of the requested service.

In some embodiments, there is provided a computer program product comprising a non-transitory computer readable medium storing a computer program comprising instructions which, when executed on at least one processor of a system for providing enterprise and information technology services management orchestrating a plurality of enterprise applications, cause the system to receive, in the system, a request for a service; determine, based on the received service request, one or more calls to implement a process for fulfilling the requested service; convey, to the one or more of the plurality of enterprise applications, the one or more calls; receive, from the one or more enterprise applications that received the one or more calls, a response for the fulfillment of the requested service; and determine, based on the received response, a completion status of the service request.

In some embodiments, there is provided a computer program product comprising a non-transitory computer readable medium storing a computer program comprising instructions which, when executed on at least one processor of an enterprise application, cause the enterprise application to send, by the enterprise application, to the system a request for service; receive, from the system, one or more calls to implement a process for fulfilling the requested service; and send, by the enterprise application, to the system a response for the fulfillment of the requested service.

Figure 13:
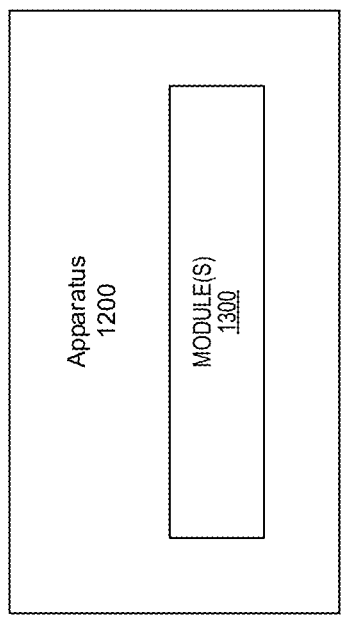
FIG. 13 is a block diagram of an apparatus according to some aspects.

FIG. 13 is a block diagram of the apparatus 1200 according to some embodiments. The apparatus 1200 includes one or more modules 1300, each of which is implemented in software. The module(s) 1300 provide the functionality of apparatus 1200 described herein and, in particular, the functionality of a system (e.g., the steps herein, e.g., with respect to FIGS. 4-11).

Exemplary Use Cases

As described above, in some embodiments, the plurality of enterprise applications are software applications that relate to business processes of an enterprise, wherein each business process is specific to a particular domain of an enterprise and wherein the particular domain is any of: Information Technology (IT), DevOps, Security, Procurement, Human Resources (HR)/talent and recruitment, Facility management, Enterprise Resource Planning (ERP), Customer Relations Management (CRM), procurement, travel, partner management, customer management, Field service management, enterprise asset management, and/or financials, and other OSS or BSS systems.

In some embodiments, the plurality of enterprise applications includes a customer relationship management (CRM) application, a human resources (HR) application, an enterprise resource planning (ERP) application, a project management application, a data services application, a marketing and/or sales application, an IT application, a support application, a finance and/or accounting application, a pre-sale application, a purchasing and/or procurement application, or a partner management application, a customer management application, Field service management, enterprise asset management, OSS, BSS, travel, procurement, devOps/development tool chain. In some embodiments, the received request for service is made by a user through any of: a self-service omni-channel portal, a collaboration software system, a mobile application, an Internet application, a browser, a client application, a multi-modal channel, an omni-channel, a voice message, a video message, a text based message, a selection from a catalog of user requests, using a graphical user interface (GUI), and/or using a chat bot, a virtual agent, a conversational system, bot or a human agent making a request on behalf of the user.

In some embodiments, the user that made the received request for service is empowered to continue to use a selected business process specific to a particular domain of the enterprise, if they prefer so, while other users of the system are not required to continue to use the selected business process specific to the particular domain for the requested service. In some embodiments, the other users of the system can use any of the enterprise applications for requesting service through the self-service omni-channel portal.

In some embodiments, users can at any time decide (if they prefer in general or for a specific request, or be prompted if a service is implemented that way) to use and/or go use a specific enterprise application. Some classes of users can use a preferred enterprise application (e.g. devops tool chain and work management like Jira), that has its process updating and updated by ESM, so that other users (e.g. business users, product management etc) can use ESM to manage R&D.

Figure 14:
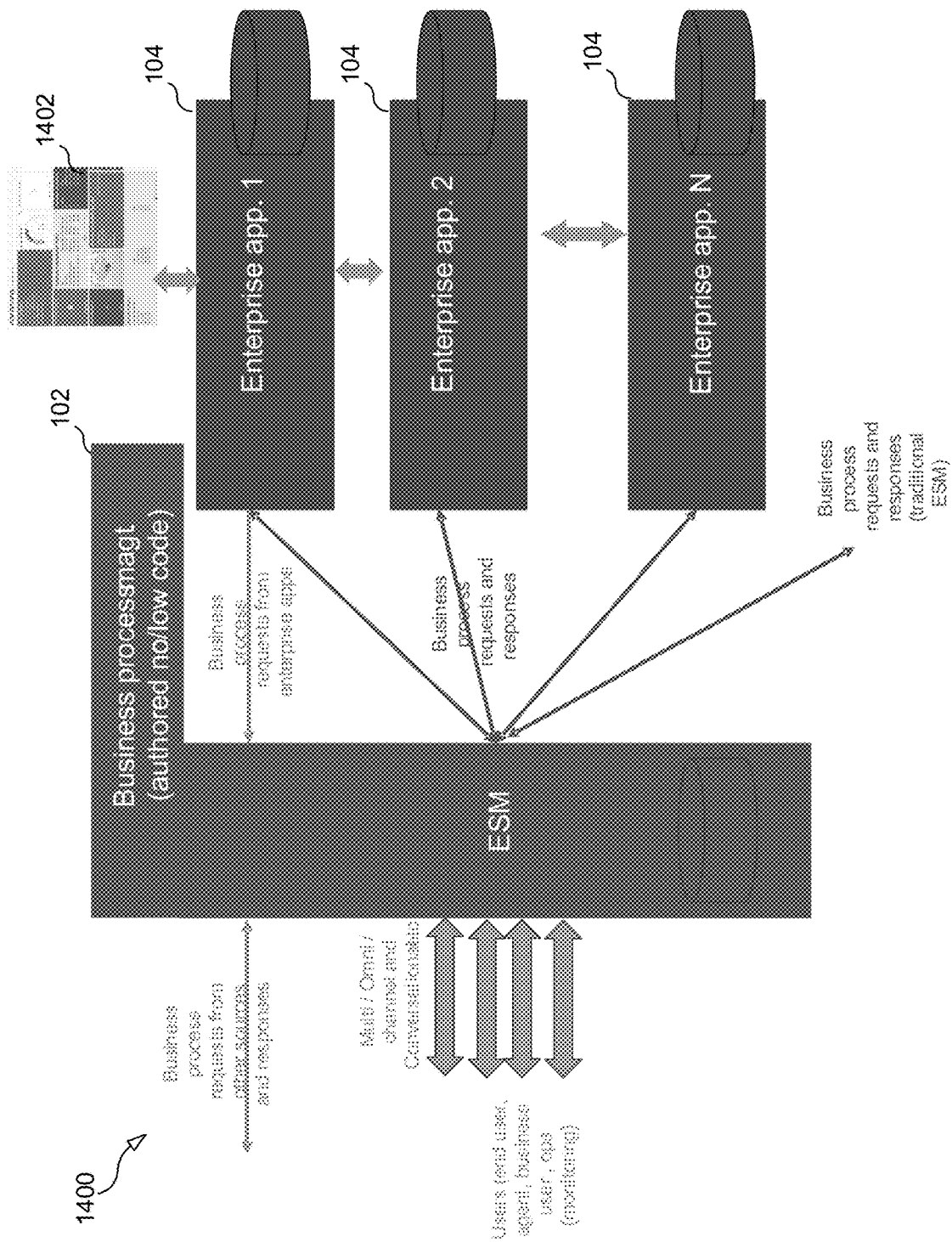
FIG. 14 illustrates a system for providing enterprise and information technology services management orchestrating a plurality of enterprise applications according to some aspects.

FIG. 14 illustrates a system 1400 according to some aspects. In some aspects, the system 1400 may include a system 102 for providing enterprise and information technology services management orchestrating a plurality of enterprise applications, referred to herein as an enterprise service management (ESM) system 102. In some aspects, as shown in FIG. 14, the system 100 may include one or more enterprise applications 104. In some aspects, the ESM system 102 may front-end the one or more enterprise applications 104.

As shown in FIG. 14, a user, such as an employee with, for example, a different focus or need than a specific user, such as a power user, of business process, enterprise application, domain or the like, may use a backend application 1402—for example an application within the use or employee's domain of focus, such as HR, CRM, FSM, ITOM or Dev Tool Chain.

ITOM Use Cases in ITSM

Expanding ITSM in the context of ITOM involves considering IT operation management capabilities and tools, and/or considering how groups other than IT support, service or help desk (e.g., IT Ops or Cloud Ops team) deal with ITSM. IT Operation management has a broad meaning in the industry, related to all aspects of ITSM, Automation, Service Assurance (monitoring/observability), governance, compliance, and AI (AIOps). But in ITSM, it typically means a subset of functionality around ITAM, Service/Asset discovery and management (CMDB), License Management, Software Asset Management, and Event management (e.g., from change management, or as a result of automation, monitoring/observability, or remediation).

ITOM (for Ops)

For Ops, this presents a different use case. ITSM is not the primary focus. In general, IT Ops teams, and now Cloud Ops teams, rely on a slew of tools to manage infrastructure and applications. In the past, it was physical servers and virtual machines, and now, it usually extends to the cloud and cloud native solutions. The primary focus is more on dashboards.
The tools include:
Service assurance tools responsible for monitoring, observability of infrastructure and applications from a performance (log, metrics, traces and⇒event processing). And security point of view, though that is often involving different teams. They apply against infrastructure (Compute, network, storage) and OS/middleware, applications, often as VM or now containers.
Compliance that compares systems states versus policy based desired states and notify of any drifts that must then be corrected by say patching.
Provisioning and automations that deploys and configure or updates systems and workloads. These may be part of bigger automation, integrations and workflows that performs such tasks.
To do so, these tools rely on knowing what to manage:
For Requests: What needs to be provisioned/deployed or updated, and where.
For Remediations of issues: what needs to be updated or patched or modified.
And then What to monitor.
These details come from ITSM and its CMDB+discovery that tracks the assets to manage, which is therefore a key component that can be seen as the, or a, brain orchestrating the others ITOM components and the single source of truth. Reports, dashboards and analytics are built on top of the data collected by the different tools. Cost governance is a good example.

With regard to AI in ITOM, such as AIOps, AI tools include the ability to perform some pattern matching and inference tasks based on data and to learn or improve those in supervised or unsupervised manner. Algorithms and models can apply to each ITOM tool.

Figure 15:
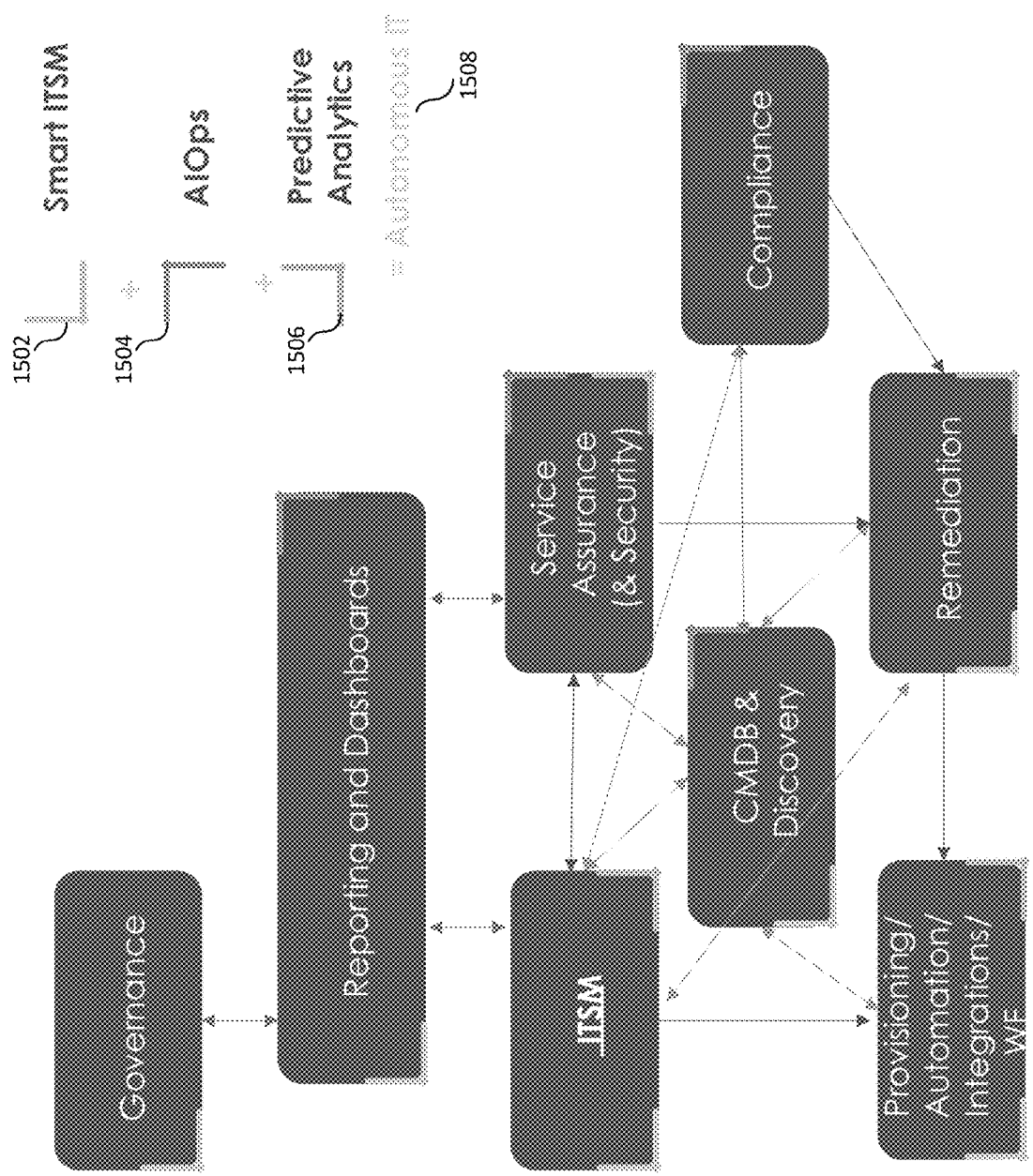
FIG. 15 illustrates diagrammatically the application of AI aspects in ITSM and ITOM, according to some embodiments.

FIG. 15 illustrates diagrammatically the application of AI aspects in ITSM and ITOM, which is much more than AIOps.
Smart ITSM features 1502 that encompass:
NLP and conversational interfaces with dialog capabilities for chats
NLP for smart searches and smart knowledge management to find best knowledge document, classify tickets or understand tickets, etc.
Intelligent processing and workflows like smart routing, agent selection based on skills etc.
AIOps 1504 which is about smart service assurance that analyses observability data (metrics, logs, traces (and associated events) to process events, to detect anomalies, analyzes times series and helps root cause analysis.
Predictive analytics 1506 that predicts trends, events, issues/incidents and problems. It leads to the ability to predict failures and provide predictive maintenance capabilities.
As the systems becomes more advanced, past tickets and changes also contribute as input to predictive analytics.
But goal is to predict problem before it occurs or user notices and so before end user open tickets.
Autonomous systems 1508 where remediation can be proposed, recommended or self-applied. This is the holy grail or No-ops, or probably rather low-ops IT (don't worry about your jobs yet).
ITSM relies on ITOM/ITAM functions to discover assets and build a single source of truth in CMDB. It makes sense to combine these tools (discovery and CMDB- or ITAM) in an ITSM/ESM tool as it relates to the assets that ITSM oversees (CI). ITSM also receives events about the assets from ITOM Tools.

ITSM is itself just an application among many in ITOM/IT Ops/Cloud Ops. Ops typically do not use ITSM, they use their own tools synched and integrated with ITSM. There is a clear separation of focus between ITSM and IT Ops tools, except for the shared CMDB. And in fact ITSM is often a different department from IT Ops.

ESM: Beyond IT and Lines of Business

This separation of focus is a key principle and pattern. For ESM, tools positioned to provide ITIL to LOBs are provided, and so in this case non-IT and focused inbound or outbound. Just as for IT Ops, enterprises and LOBs have their own tools. It is, for example, typical enterprise applications like ERP, CRM, FSM, Facilities, HR, Procurements, asset management, Financials and other BSS. Such tools are expert and optimized at specific functions, domain or sometimes industries.

How does ESM relate? Clearly, it may not be a good idea to just attempt to reimplement in ESM workflows the business logics captured in these enterprise applications. It requires expertise that ESM vendors and business owner probably do not have. Thus, consider what value ESM can bring and what it should not be doing, on a case-by-case basis.

ITSM/ESM, DevOps and Software Development Lifecycle
Consider DevOps and DevSecOps or Software development life cycle management in general. It is an area of focus for ITIL v4, Safe and IT4IT and more agile initiatives. Some vendors initiatives and subsequent analysts rewarding ratings may have at time suggested that ITSM/ESM tools can be used for DevOps purpose and conversely. After all, development tasks management, bugs tracking and resolution does not seem that different from help desk activities, change management and request fulfillment. The analogy probably stops there.

From a developers standpoint (as a developer or dealing with them), especially once they have adopted DevOps, agile and scrums, ITIL, ITSM and its rigorous change management control processes seem also the antithesis of development agility, where next steps are planned just in time and changing or adapting all the time with minimum overhead and bureaucracy. Furthermore, it is challenging to impose such tools on developers. Developers will, typically, want to use their own preferred dev tool chain, and you must be ready to accommodate different choices of surrounding tools, especially with a trend towards open-source tools.

Suggesting that developers should use ITSM to manage their work or project is typically unacceptable and, in many cases, developers will ignore it, bypass it, rebel or quit. Vendors that have had such ambitions have not fared too well in that endeavor so far.

Figure 16:
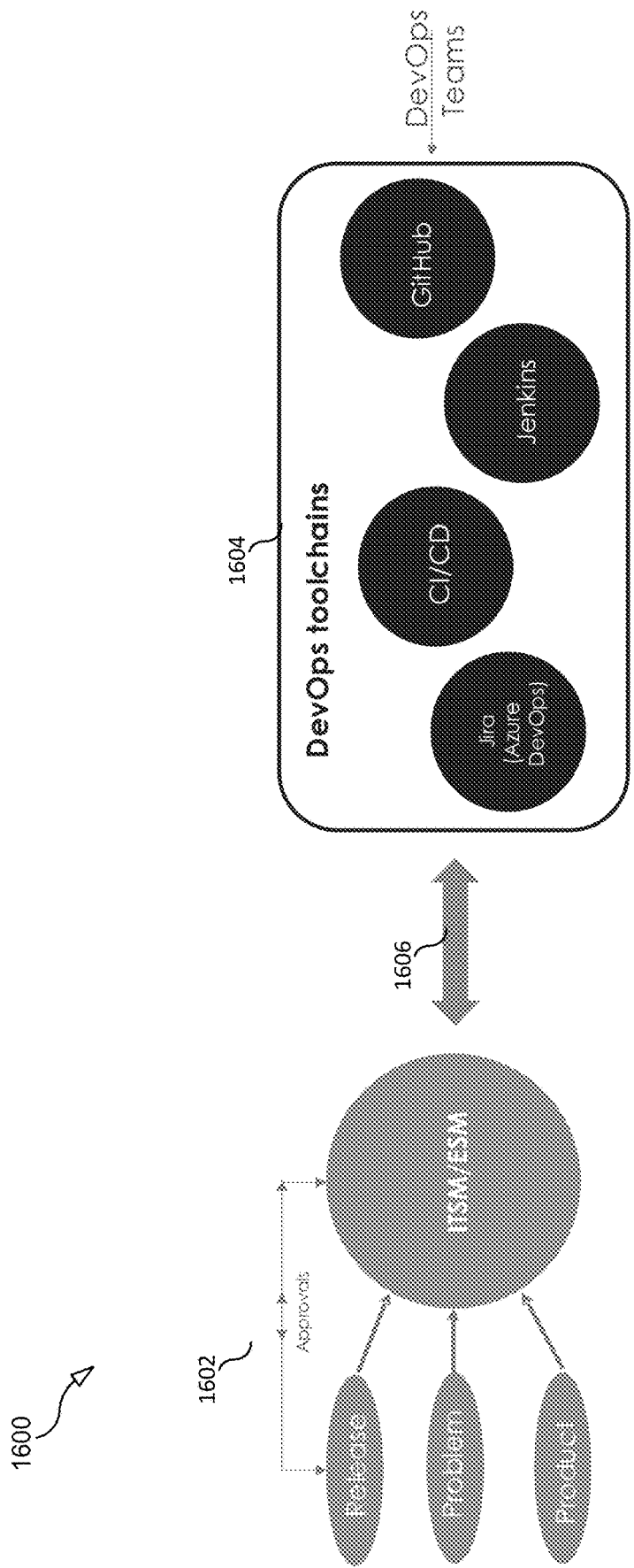
FIG. 16 illustrates the recommended separation of focus between Dev Tools chains (DevOps) and ITSM, according to some embodiments.

FIG. 16 illustrates the recommended separation of focus between Dev Tools chains (DevOps) and ITSM. The key aspects of this recommended separation of focus include:
  ITSM/ESM are not part of the DevOps toolchains
  DevOps is about agility and somehow antithesis of Change management processes
  ITSM does not subsume DevOps toolchains but works with them in such that:
    ITSM user can perform release and DevOps (work) management without having to use DevOps toolchain
    DevOps can pursue their daily business without bothering about Change Management and ITIL
  Yet both can work together.

It makes sense to separate focus 1600 as illustrated in FIG. 16 for at least the following reasons. Business owners like program and problem managers or release management can use ITSM/ESM 1602 to manage incident, or enhancement requests and associate resolution to releases that can be approved and progressed. Deployments 1604 can be triggered via Jenkins from GitHub etc. As they progress, synchronization takes place with DevOps work management tools like Jira or Azure DevOps, that DevOps can use to define and manage their work and update progresses that are then reflected back to ESM 1606.

Developers and DevOp can therefore continue to work in their preferred tool chain, and ignore the ITSM/ESM tools and change management processes that they support. And yet still fit the change management process from the point of view of the business. In other words, every team can use their preferred tools, especially dev can use their preferred dev tool chain. Neither team is forced to understand, use, or even just go to the other practices tools. That is what is really meant by separation of focus.

So, for example, for DevOps, it is not necessary to bring them to ITSM/ESM and conversely, use your ITSM/ESM for the business/LOBS and let the developers continue to use their preferred dev tool chain. Just integrate and synchronize between the two systems so that actions on one side are reflected on the other.

Facilities Maintenance (e.g., FSM+ERP/CRM)

Figure 17:
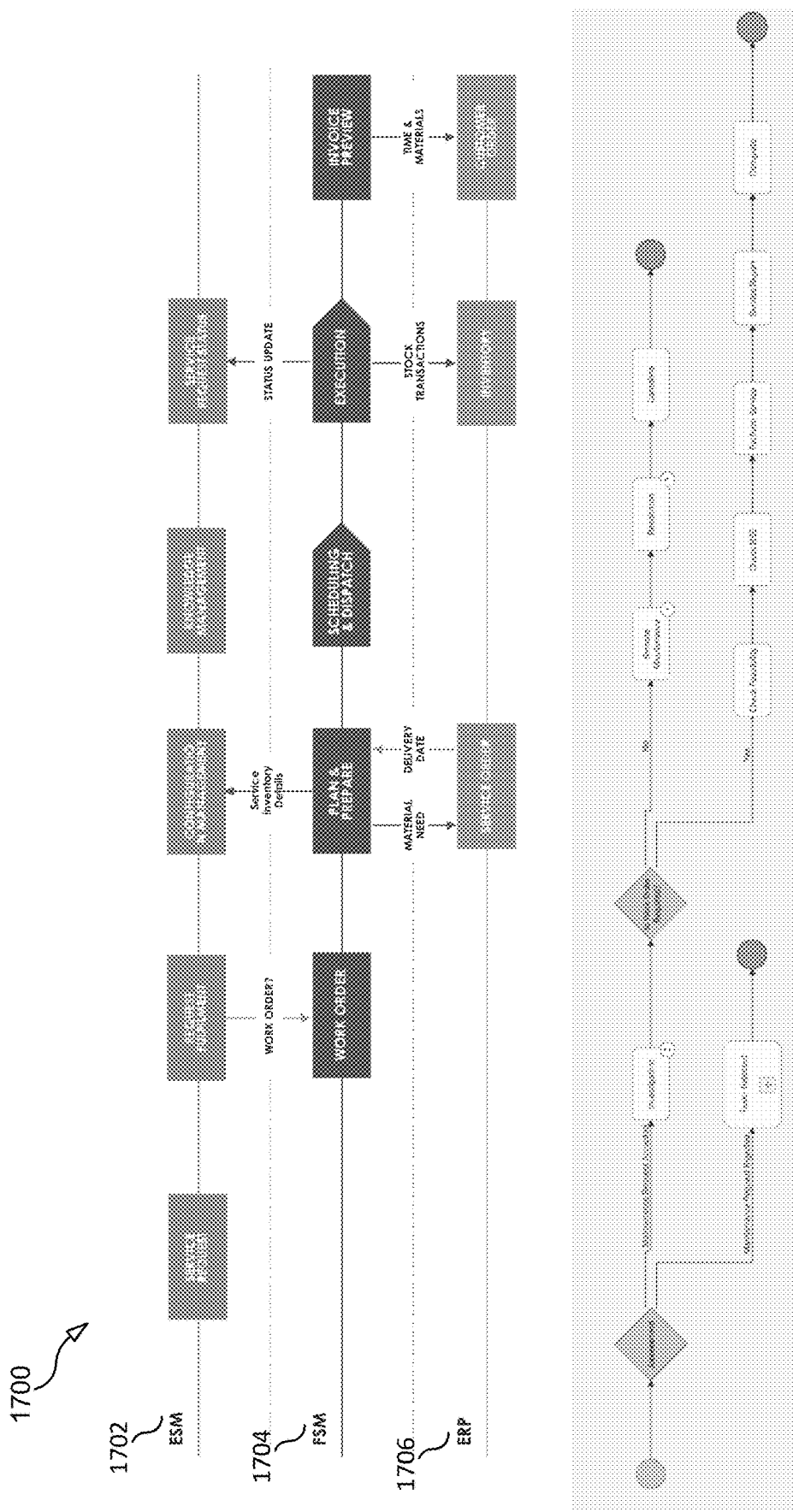
FIG. 17 illustrates an ESM/ITSM and Field Service Management use case and example of separation of focus, according to some embodiments.

FIG. 17 illustrates an ESM/ITSM and Field Service Management use case and example of separation of focus 1700. This use case considers the case of a facility maintenance with associated "field service management." It is an ITSM and ESM service. Besides the more traditional use cases of room reservation using ESM, let us consider that use cases where rooms may have problems with thermostat, air conditioning, TV or projector.

Room reservation is a simple request to fulfill use case of ESM. No need to explain much more other than understand that, while the room reservation management could be implemented by ESM logic, it is typically a request delegated to another system. Issues with the room are typically an incident management with report of an issue to be fixed and creation of a ticket. Although apparently trivial, we can see that the resolution requires possibly ordering parts and dispatching a worker to fix the issue. That includes creating work order, making request to a procurement systems, etc.

While this could be implemented in ESM or in a proprietary backend, the likelihood is that it will be complex and suboptimal. There are enterprise applications that can do this. For example, "field Service management" and ERP/CRM. Such applications may be used for core business. FSM provides the ability to create work order, schedule and dispatch technicians and even manage fleets. That matters when having to dispatch to different facilities across wide or multiple geographies etc.

So the principle is that ticket, request or steps to resolve trigger workflows that trigger business processes in FSM to create work order, dispatch technician, manage repair and close the issue. In between the ordering of the part (that could be done from ESM or from FSM, depending on how you have built your business processes, let us assume that it is done from FSM) or charging the requester, determining rate or SLA etc. (if from a client in a managed service provider deal for example).

FSM ordering the part is an example of reuse of what exists: FSM in general will involve these steps and integration with procurement, CRM or ERP. It is typically out of the box between these applications.

We can see a repeat of the separation of focus encountered with the broader ITOM, and with DevOps. Self-service support request and case management is in ITSM/ESM 1702; order management, work management and scheduling, dispatch and repair is done by the application best designed for that, FSM 1704; and procurement of parts, charging/SLA determination can come from CRM or ERP 1706.

ESM and Field Service Management (FSM)

Figure 18:
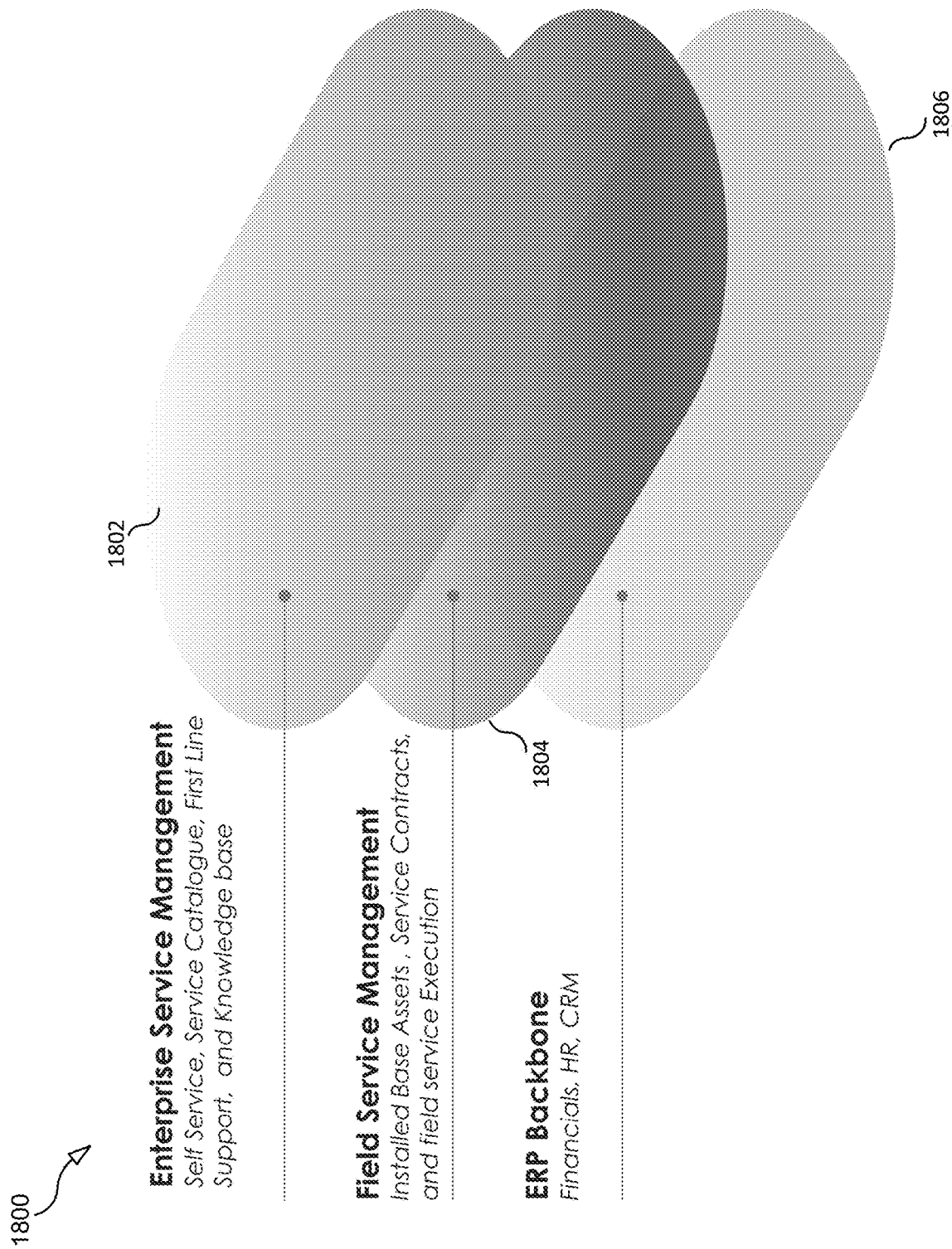
FIG. 18 illustrates a recommended separation of focus architecture between ESM/ITSM, FSM and ERP/CRM, according to some embodiments.

FIG. 18 illustrates a recommended separation of focus architecture 1600 between ESM/ITSM 1802, FSM 1804 and ERP/CRM 1806 for facility maintenance or FSM combined with ESM/ITSM in general.

HR

The same applies for HR use cases where, besides the traditional ESM HR use cases like on-boarding of new employee, or HR support, we now can have actions in the HR application that result into notification, approval request or new available offerings in ESM. Actions in ESM can similarly trigger next steps in the HR application.

I discuss it that way rather than showing an actual use cases, because I want to illustrate a different point. Yes the separation of focus is the same as earlier. But while in the FSM cases, different personas use different applications . . . . Here things may change: employees may start in ESM and have HR or managers continue in HR application. But sometimes he can start in HR applications and have others continuing in ESM and back and forth.

So this is an example, where the separation of focus is less about persona and more about tasks to be done: complex HR tasks can be done or checked in HR applications, but they can be triggered from ESM: ESM is about easy self-service while HR is again where the tough specialized logic runs and confidential data may remain segregated: ESM may not remove the need to interact directly with the enterprise applications. But it could if interactions could be multiple back and forth with notification of the user of update to be pursued in ESM.

ERP & Enterprise Applications

In some aspects, ESM provides an (omnichannel) self-service frontend to enterprise applications to execute end to end business processes that may involve enterprise app by triggering some of them or orchestrating them. Other persona may react also using ESM or directly using the enterprise apps. The first option may require notifications of status update in ESM.

When enterprise apps are pre-integrated, request fulfillment by triggering the backend can be accomplished. If not, it amounts to orchestrating the enterprise applications. If, for example, a user of ESM is interacting through MS Teams and ESM orchestrates the enterprise applications, we have MS teams as channel to interact with ESM that performs an AIA (orchestrated EAI) integration of enterprise applications.

Embodiments disclosed herein enable having a subset of the functionality moved to a specific channel. For example, ESM (such as IFS assyst) supports a MS teams channel where:

An end user can interact using teams to chat to a chat bot or virtual agent in teams and then make a request for something (a request for an item, for documentation/knowledge or support) and also be transferred to an agent if needed.

Similarly agents can interact with end user via teams (they received the beginning of the conversation with virtual agent and context (history) from virtual agent when transferred) or collaborate on their side (e.g. other agents, other level of support, R&D etc) in what is sometimes called swarming or collaboration to address problem. That can also go along with interaction with a bot or virtual agent.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, as used herein, receiving a request or other message from a system, application, device or the like encompasses receiving the request or other message directly from the system, application, device or the like, or indirectly from the system, application, device or the like (e.g., one or more nodes are used to relay the request or other message). ###Likewise, as used herein, transmitting a message to a device encompasses transmitting the message directly to the device or transmitting the message indirectly to the device (i.e., one or more nodes are used to relay the message from the source to the device).

Also, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A computer implemented method for providing enterprise and information technology services management orchestrating a plurality of enterprise applications, the method performed by a system comprising processing circuitry and a memory, the memory containing instructions executable by the processing circuitry, the method comprising:

receiving, in the system, a request for a service;
determining, based on the received service request, one or more calls to implement a process for fulfilling the requested service;
conveying, to the one or more of the plurality of enterprise applications, the one or more calls, wherein the one or more enterprise applications comprise a first enterprise application of a first type and a second enterprise application of a second type, the first type and the second type being different;
receiving, from the one or more enterprise applications that received the one or more calls, a response for the fulfillment of the requested service;
determining, based on the received response, a completion status of the service request; and
if the determination of the completion status of the service request is that the request status is incomplete:
(i) determining, based on the received response, one or more additional calls to implement an additional process for fulfilling the requested service;
(ii) conveying, to the one or more of the plurality of enterprise applications, the additional one or more calls;
(iii) receiving, from the one or more enterprise applications that received the one or more additional calls, an additional response for fulfillment of the requested service;
(iv) determining, based on the received additional response, an updated completion status of the service request; and
repeating steps (i) to (iv) until the updated completion status of the service request is that the request status is complete.

2. The method according to claim 1, wherein the process implemented by the one or more calls includes a process internal to the system, a process externally defined via a workflow, and/or a process of one or more of the plurality of enterprise applications.

3. The method according to claim 1, further comprising executing a workflow, wherein execution of the workflow is triggered by the received request and conveying, to the one or more of the plurality of enterprise applications, the one or more calls is triggered by the workflow.

4. The method according to claim 1, further comprising executing a workflow, wherein executing the workflow is triggered by the received response and conveying, to the one or more of the plurality of enterprise applications, the one or more additional calls is triggered by the workflow.

5. The method according to claim 1, wherein the requested service involves one or more of creation of, knowledge of, management of, optimization of, clarification of, request for, support for, approval of, or access to information, a service offered in a catalog, and/or a business process.

6. The method according to claim 1, wherein the plurality of enterprise applications are software applications that relate to business processes of an enterprise, wherein each business process is specific to a particular domain of an enterprise and wherein the particular domain is any of:

Information Technology (IT), DevOps, Security, Procurement, Human Resources (HR)/talent and recruitment, Facility management, Enterprise Resource Planning (ERP), Customer Relations Management (CRM), procurement, travel, partner management, customer management, Field service management, enterprise asset management, and/or financials, and other OSS or BSS systems.

7. The method according to claim 6, wherein the received request for service is made by a user through any of: a self-service omni-channel portal, a collaboration software system, a mobile application, an Internet application, a browser, a client application, a multi-modal channel, an omni-channel, a voice message, a video message, a text based message, a selection from a catalog of user requests, using a graphical user interface (GUI), and/or using a chat bot, a virtual agent, a conversational system, bot or a human agent making a request on behalf of the user.

8. The method according to claim 7, wherein the user that made the received request for service is empowered to continue to use a selected business process specific to a particular domain of the enterprise, while other users of the system are not required to continue to use the selected business process specific to the particular domain for the requested service.

9. The method according to claim 8, wherein the other users of the system can use any of the enterprise applications for requesting service through the self-service omni-channel portal.

10. The method according to claim 1, wherein the plurality of enterprise applications includes a customer relationship management (CRM) application, a human resources (HR) application, an enterprise resource planning (ERP) application, a project management application, a data services application, a marketing and/or sales application, an IT application, a support application, a finance and/or accounting application, a presale application, a purchasing and/or procurement application, or a partner management application, a customer management application, Field service management, enterprise asset management, OSS, BSS, travel, procurement, devOps/development tool chain.

11. The method according to claim 1, further comprising performing a workflow, wherein the workflow is designed low code/no code using a graphical user interface (GUI) or by combining one or more existing workflows saved in a catalog, rather than by coding.

12. The method according to claim 1, wherein the received request for a service is self-service from a user and the fulfillment of the requested service is to the user.

13. The method according to claim 1, wherein the request for service received in the system is through an application programming interface (API) call from any of: an enterprise application, a business process, and/or a service within the system, and/or from one or more external systems.

14. The method according to claim 1, wherein one or more of the one or more calls includes using artificial intelligence (AI), wherein the AI includes a machine learning (ML) model, and wherein using AI enables any of: autonomously completing a business process, including while interacting with a user; interpreting a request or response; optimizing processes and performances, determining which of the plurality of enterprise applications to call; determining the cause of an error through root cause analysis; making recommendations to remediate an error; implementing conversational and natural language interfaces; implementing advanced searches to support a request or response; routing request or support to best agent or system able to fulfill it, analyzing reports and autonomous fulfillment of a request; monitoring request status; predicting and detecting problems in the system; and/or implementing solutions to detected problems.

15. The method according to claim 1, wherein the received request for the service is from a user, and the method further comprising:
  prompting the user, from the system, via a prompt, in the event the user is available on a web application or in a chat, or by sending a notification, with a follow-up request for interaction by the user, wherein the request for interaction was conveyed by one or more of the plurality of enterprise applications or by the system in connection with fulfillment of the requested service;
  receiving, in the system, a user answer;
  determining, based on the user answer, one or more next steps in a workflow, including one or more additional calls to one or more of the plurality of enterprise applications for fulfillment of the requested service; and
  conveying, to the one or more of the plurality of enterprise applications, the one or more additional calls for fulfillment of the requested service based on the user answer.

16. The method according to claim 1, wherein the request for service includes a request for support or a request for knowledge.

17. The method according to claim 1, further comprising:
  receiving, in the system, a request for external system interaction conveyed by an enterprise application;
  conveying it via an application programming interface (API) call to an external system;
  receiving, in the system, a response conveyed by the external system; and
  conveying a response to the request for external system interaction to the enterprise application.

18. A computer program product comprising a non-transitory computer readable medium storing a computer program comprising instructions which, when executed on at least one processor of a system for providing enterprise and information technology services management orchestrating a plurality of enterprise applications, cause the system to:
  receive a request for a service;
  determine, based on the received service request, one or more calls to implement a process for fulfilling the requested service;
  convey, to the one or more of the plurality of enterprise applications, the one or more calls, wherein the one or more enterprise applications comprise a first enterprise application of a first type and a second enterprise application of a second type, the first type and the second type being different;
  receive, from the one or more enterprise applications that received the one or more calls, a response for the fulfillment of the requested service;
  determine, based on the received response, a completion status of the service request; and
  if the determination of the completion status of the service request is that the request status is incomplete:
    (i) determine, based on the received response, one or more additional calls to implement an additional process for fulfilling the requested service;
    (ii) convey, to the one or more of the plurality of enterprise applications, the additional one or more calls;

(iii) receive, from the one or more enterprise applications that received the one or more additional calls, an additional response for fulfillment of the requested service;
(iv) determine, based on the received additional response, an updated completion status of the service request; and
repeat steps (i) to (iv) until the updated completion status of the service request is that the request status is complete.

19. A system for providing enterprise and information technology services management orchestrating a plurality of enterprise applications, the system comprising:
processing circuitry; and
a memory, the memory containing instructions executable by the processing circuitry, whereby the system is configured to:
receive a request for a service;
determine, based on the received service request, one or more calls to implement a process for fulfilling the requested service;
convey, to the one or more of the plurality of enterprise applications, the one or more calls, wherein the one or more enterprise applications comprise a first enterprise application of a first type and a second enterprise application of a second type, the first type and the second type being different;
receive, from the one or more enterprise applications that received the one or more calls, a response for the fulfillment of the requested service;
determine, based on the received response, a completion status of the service request; and
if the determination of the completion status of the service request is that the request status is incomplete:
(i) determine, based on the received response, one or more additional calls to implement an additional process for fulfilling the requested service;
(ii) convey, to the one or more of the plurality of enterprise applications, the additional one or more calls;
(iii) receive, from the one or more enterprise applications that received the one or more additional calls, an additional response for fulfillment of the requested service;
(iv) determine, based on the received additional response, an updated completion status of the service request; and
repeat steps (i) to (iv) until the updated completion status of the service request is that the request status is complete.

20. The system according to claim 19, wherein the process implemented by the one or more calls includes a process internal to the system, a process externally defined via a workflow, or a process of one or more of the plurality of enterprise applications.

21. The system according to claim 19, further configured to execute a workflow, wherein executing the workflow is triggered by the received request and conveying, to the one or more of the plurality of enterprise applications, the one or more calls is triggered by the workflow.

22. The system according to claim 19, further configured to execute a workflow, wherein executing the workflow is triggered by the received response and conveying, to the one or more of the plurality of enterprise applications, the one or more additional calls is triggered by the workflow.

\* \* \* \* \*